(12) United States Patent
Derks et al.

(10) Patent No.: US 9,393,729 B2
(45) Date of Patent: Jul. 19, 2016

(54) CONTROLLING CROSS-WEB LAYER PROFILE OF A MULTILAYER POLYMER FILM

(75) Inventors: Kristopher J. Derks, Woodbury, MN (US); Robert M. Biegler, Woodbury, MN (US); Terence D. Neavin, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 994 days.

(21) Appl. No.: 13/522,061

(22) PCT Filed: Jan. 10, 2011

(86) PCT No.: PCT/US2011/020666
§ 371 (c)(1),
(2), (4) Date: Feb. 6, 2013

(87) PCT Pub. No.: WO2011/087983
PCT Pub. Date: Jul. 21, 2011

(65) Prior Publication Data
US 2013/0127086 A1    May 23, 2013

Related U.S. Application Data

(60) Provisional application No. 61/295,329, filed on Jan. 15, 2010.

(51) Int. Cl.
*B29C 47/06* (2006.01)
*B29C 47/00* (2006.01)
(Continued)

(52) U.S. Cl.
CPC ........... *B29C 47/065* (2013.01); *B29C 47/0021* (2013.01); *B29C 47/30* (2013.01); *B29C 47/56* (2013.01); *B29C 47/862* (2013.01);
(Continued)

(58) Field of Classification Search
CPC ...... B29C 47/065; B29C 47/30; B29C 47/56; B29C 47/862; B29C 47/92; B29C 47/70; B29C 47/707; B29C 2947/92152; B29C 2947/92704; B29C 2947/92904
USPC .......................... 264/173.16; 425/463, 133.5
See application file for complete search history.

(56) References Cited

U.S. PATENT DOCUMENTS 3,507,939 A * 4/1970 Williams ................ B29C 47/54
264/176.1
5,094,788 A    3/1992 Schrenk et al.
(Continued)

FOREIGN PATENT DOCUMENTS

EP    0802034    10/1997
GB    2 338 923    1/2000
(Continued)

*Primary Examiner* — Alison L Hindenlang
*Assistant Examiner* — Lawrence D Hohenbrink, Jr.
(74) *Attorney, Agent, or Firm* — Lisa P. Fulton; Daniel J. Iden

(57) ABSTRACT

A method is disclosed that includes forming a plurality of polymer layers via a plurality of slots, wherein the plurality of layers are combined to generate a multilayer polymer flow stream; and controlling heat flow to the plurality of slots in conjunction with the formation of the plurality of polymer layers. The multilayer polymer flow stream may be used to generate a multilayer film. In some embodiments, the cross-web layer thickness profile may be controlled by controlling heat flow to the plurality of slots that form the plurality of polymer layers.

21 Claims, 18 Drawing Sheets

(51) Int. Cl.
    *B29C 47/30*        (2006.01)
    *B29C 47/56*        (2006.01)
    *B29C 47/92*        (2006.01)
    *B29C 47/70*            (2006.01)
    *B29C 47/86*            (2006.01)
    *B29L 7/00*             (2006.01)
    *B29L 9/00*             (2006.01)
    *B29L 11/00*            (2006.01)

(52) U.S. Cl.
    CPC ............ *B29C 47/92* (2013.01); *B29C 47/0047* (2013.01); *B29C 47/70* (2013.01); *B29C 47/707* (2013.01); *B29C 47/86* (2013.01); *B29C 2947/92152* (2013.01); *B29C 2947/92438* (2013.01); *B29C 2947/92514* (2013.01); *B29C 2947/92704* (2013.01); *B29C 2947/92904* (2013.01); *B29L 2007/00* (2013.01); *B29L 2007/002* (2013.01); *B29L 2009/00* (2013.01); *B29L 2011/00* (2013.01)

(56) References Cited

U.S. PATENT DOCUMENTS

| | | | |
|---|---|---|---|
| 6,409,494 | B1 | 6/2002 | Voss |
| 6,738,349 | B1 | 5/2004 | Cen |
| 6,783,349 | B2 | 8/2004 | Neavin et al. |
| 2008/0063841 | A1 | 3/2008 | Matsubara et al. |
| 2009/0035410 | A1* | 2/2009 | Mizunuma .......... B29C 47/0021 425/170 |
| 2009/0243133 | A1* | 10/2009 | Wong .................. B29C 47/34 264/40.6 |

FOREIGN PATENT DOCUMENTS

| | | |
|---|---|---|
| JP | 63 120629 | 5/1988 |
| JP | 11 309770 | 11/1999 |
| JP | 2004-034299 | 2/2004 |

\* cited by examiner

CONTROLLING CROSS-WEB LAYER PROFILE OF A MULTILAYER POLYMER FILM

CROSS REFERENCE TO RELATED APPLICATIONS

This application is a national stage filing under 35 U.S.C. §371 of PCT/US20011/020666, filed Jan. 10, 2011, which claims priority to Provisional Application No. 61/295,329, filed Jan. 15, 2010, the disclosure of which is incorporated by reference in its/their entirety herein.

TECHNICAL FIELD

This disclosure relates to multilayer films and, in particular, apparatuses and techniques for manufacturing multilayer polymeric films.

BACKGROUND

A multilayer polymeric film may be manufactured via a film line that includes a feedblock apparatus configured to receive and then orient appropriate polymer materials in a manner that generates a multilayer polymer flow stream having a plurality of individual polymer layers stacked on top of one another. After being generated in the feedblock apparatus, the multilayer flow stream may undergo further processing along the film line to produce a multilayer polymer film possessing one or more desirable properties.

Multilayer polymeric films may exhibit a wide range of optical and physical properties, and may be utilized in a variety of optical and non-optical applications. The optical and physical properties of a multilayer film may depend on a number of variables, including the composition of the individual polymer layers, the overall number of individual layers of a film, and/or the layer thickness profile of the film. Accordingly, the properties of a multilayer film may be tailored by precisely controlling one or more of these variables during the film manufacturing process.

SUMMARY

In general, the disclosure relates to systems, devices, and techniques for controlling one or more properties of a multilayer polymer film generated from a multilayer flow stream having a plurality of individual polymer layers. In some embodiments, the system, devices, and techniques relate to controlling one or more cross-web film properties of a multilayer film, such as, for example, the film's cross-web layer thickness profile, during the manufacturing process, e.g., by controlling heat flow to one or more slots within the slot die section of a multilayer feedblock. Each of the slots may be configured to orient the flow of a polymer melt stream to form polymer layers that are combined with one another to generate a multilayer flow stream, which may be further processed within a film line to generate a multilayer polymeric film. By controlling heat flow to one or more slots, the temperature and pressure of the polymer melt stream within a respective slot may be controlled in a manner that influences the thickness of the polymer layer formed by the respective slot.

In some embodiments, heat flow may be controlled by selectively providing heat to one or more slots within a multilayer feedblock. The heat provided to a slot may create a temperature gradient in the polymer melt stream within the slot in a manner that promotes flow to certain portions of the slot, thereby influencing the thickness of the polymer layer in the cross-web direction. For example, heat may be selectively provided to the edge of one or more slots to generate a temperature gradient in which the temperature of the melt stream within the slot is greater at the edge of the slot relative other locations nearer the center of the slot. In such cases, the temperature gradient may promote flow towards the edge of the slot, which may influence the thickness profile of the polymer layer generated via the respective slot relative the cross-web direction, e.g., by increasing the relative thickness of the polymer layer at the position on the cross-web corresponding to the increased flow within the slot. In this manner, one or more aspects of a cross-web layer thickness profile of a film may be controlled by controlling heat flow to one or more slots that form polymer layers of a multilayer polymer flow stream. Notably, controlling the heat provided proximate the edge of one or more slots may allow for layer thickness profile control of one or more polymer layers relative to the cross-web direction.

In one embodiment, the disclosure is directed to a method including forming a plurality of polymer layers via a plurality of slots, wherein the plurality of polymer layers are combined to generate a multilayer polymer flow stream; and controlling heat flow to the plurality of slots in conjunction with the formation of the plurality of polymer layers.

In another embodiment, the disclosure is directed to a system including a plurality of slots configured to form a plurality of polymer layers that are combined to generate a multilayer polymer flow stream; and at least one heater proximate the plurality of slots configured to control heat flow to the plurality of slots in conjunction with the formation of the plurality of polymer layers.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 6A through 14A are plots of baseline layer thickness profiles and experimental layer thickness profiles of a multilayer film at various cross-web locations illustrating the effects of heating a portion of a slot die section of a multilayer feedblock.

FIGS. 6B through 14B are plots corresponding to FIGS. 6A through 14A, respectively, illustrating the difference between the baseline layer thickness profile and experimental layer thickness profile.

DETAILED DESCRIPTION

Figure 1:
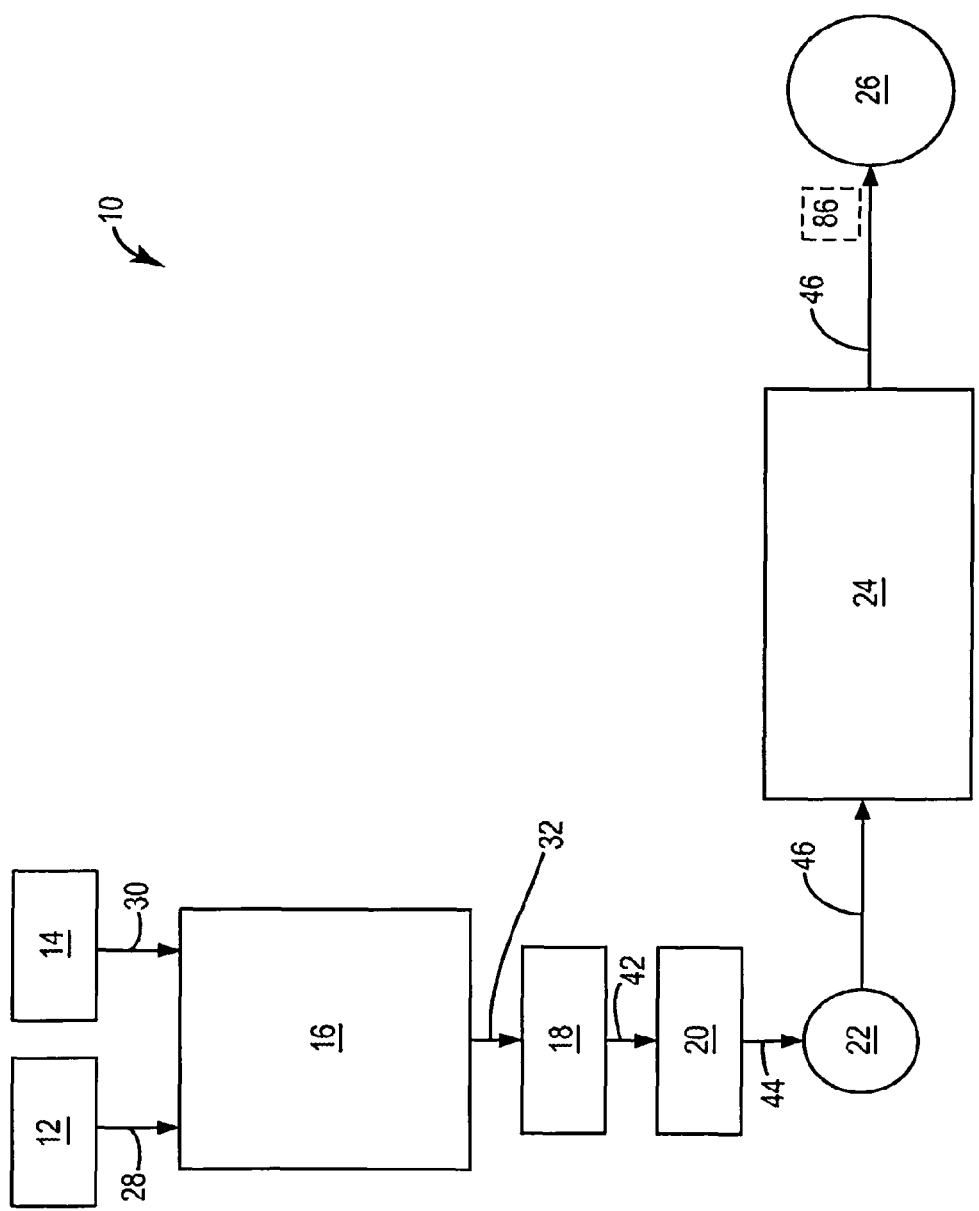
FIG. 1 is a schematic diagram illustrating an example film line that may be used to manufacture a multilayer polymeric film.

The present disclosure relates to systems, devices and techniques for manufacturing multilayer polymeric films. In some embodiments, systems, devices and techniques relating to the manufacturing of such multilayer film may be used to control one or more properties of the multilayer film, such as, e.g., the layer thickness profile of the multilayer film, by controlling heat flow provided to one or more slots configured to form individual polymer layers from polymer melt streams. The individual polymer layers formed via the one or more slots may be combined with one another to form a multilayer flow stream that may be extruded to form a multilayer polymer film. In some cases, the amount of heat flow provided to the slots may influence the behavior of the polymer melt stream within the respective slot, e.g., by changing the temperature and/or pressure of the polymer melt stream within the slot, such that the thickness of the polymer layer resulting from the polymer stream is affected. In this manner, the layer thickness profile of a multilayer polymer film may be influenced by the amount of heat provided to one or more slots used to form individual polymer layers of a multilayer flow stream.

In general, a multilayer polymeric film may include a plurality of individual layers each including one or more types of polymer materials. For example, certain multilayer optical films may include hundreds of individual polymer layers alternating between high and low index polymer materials. The formation of such polymer layers may be accomplished via a feedblock apparatus that receives suitable polymer materials, generally in the form of polymer melt streams, and orients the polymer materials into a multilayer polymer flow stream including a stack of individual polymer layers. After exiting a feedblock, the multilayer flow stream may then be further processed within a film line to generate a multilayer optical film. Examples of feedblocks and film lines configured to manufacture multilayer optical films are described, e.g., in U.S. Pat. No. 6,783,349 to Neavin et al., titled APPARATUS FOR MAKING MULTILAYER OPTICAL FILMS.

For purposes of illustration, embodiments of the disclosure are generally described with regard to manufacturing multilayer optical polymer films. However, it is recognized that embodiments of the disclosure are not limited to optical polymer films but instead may also include non-optical multilayer polymer films, e.g., multilayer polymer films designed for non-optical applications.

As previously described, one or more of the physical and/or optical properties of a multilayer film may depend on the total number of individual polymer layers in the film. Accordingly, in some cases, the number of layers in a multilayer film may be controlled during the manufacturing process to produce a film having one or more desired properties. For example, a feedblock may be designed to orient received polymer melt streams in a manner that generates a multilayer flow stream with a desired number of individual polymer layers to achieve certain optical and/or physical properties.

Furthermore, in addition to controlling the number of individual layers of a multilayer optical film, it may also be desirable to precisely control the thickness of the individual polymer layers that make up the multilayer optical film, the combination of which may be generally referred to as a layer thickness profile or, more particularly, the cross-web layer thickness profile when evaluated in substantially the cross-web direction of the film. For example, one or more physical and/or optical properties of a multilayer optical film may depend on the cross-web layer thickness profile of the multilayer optical film in addition to the number of individual layers in the film. In some cases, it may be desirable for a multilayer film to possess a cross-web layer thickness profile such that there is a linear variation or gradient of layer thicknesses throughout a multilayer film. Deviation of the layer thickness within a multilayer optical film from a target layer thickness profile may result in degradation of the film's performance.

For at least the above reasons, it is generally desirable to precisely control the layer thickness profile of the multilayer flow stream generated by a feedblock. A limited number of techniques may be implemented, whether it be in the design of the feedblock or in the manufacturing process itself, to at least partially provide for control or "tuning" of the layer thickness profile in the multilayer flow stream. In some examples, the cross-web layer thickness profile may be controlled by defining the flow dimensions within a feedblock, via precise machining of the feedblock housing, in a manner that promotes differential flow along the cross-web direction of the polymer layers. However, such an approach may be expensive and time consuming, in addition to providing substantially no adjustment capabilities during a film manufacturing run.

Additionally, or alternatively, the cross-web layer thickness profile may be controlled based on the processing conditions associated with the manufacturing process, such as, e.g., the polymer material selected, polymer melt temperatures, temperature of the feedblock, and/or differential feedblock temperatures. However, controlling the cross-web layer thickness profile in this manner may affect all of the polymer layers in the multilayer film, rather than individual layer and/or groupings of polymer layers within the multilayer film, which may make it difficult, if not impossible in some cases, to control the cross-web layer thickness profile to the degree of precision that is required to tailor properties of a multilayer film.

Example techniques for controlling or "tuning" the layer thickness profile of a multilayer film may include one or more of the examples described in U.S. Pat. No. 6,783,349 to Neavin et al. In some embodiments, Neavin may describe one or more axial rod heaters located proximate to the conduits that deliver polymer melt streams to slots within the feedblock in a configuration that allows additional heat to be provided to the melt stream flowing within the respective conduits. The heat provided by the axial rod heaters may locally lower the polymer viscosity and promote additional polymer flow within the conduits. In such cases, the amount of heat added per location may be adjusted and controlled to modify the layer thickness and/or optical spectra of the multilayer film that is manufactured from the multilayer polymer flow stream generated by the feedblock.

In some cases, the heat provided to one or more conduits may affect the polymer layer(s) corresponding to the one or more conduits over the entire width of the slot. For example, increasing the flow of polymer melt within a conduit may influence the thickness of the resulting polymer layer over the entire cross-web direction. However, such a technique may not provide adequate control of the thickness of the polymer layer formed via a slot relative the cross-web direction of the layer.

FIG. 1 is a schematic diagram illustrating an example film line 10 which may be used to manufacture a multilayer polymer film. In general, film line 10 may be configured to receive one or more polymer materials and process the polymer materials to form a multilayer polymer film, such as, e.g., a multilayer optical film, having a plurality of individual layers composed of the received polymer materials.

As show in FIG. 1, film line 10 includes first extruder 12, second extruder 14, feedblock 16, multiplier 18, extrusion die 20, casting wheel 22, orienter 24, and wind-up roll 26. Film line 10 may be used to manufacture a multilayer film having individual polymer layers including either first polymer material 28, which corresponds to first extruder 12 or a second polymer material 30, which corresponds to the second extruder 14.

First polymer material 28 and second polymer material 30 may be heated to a temperature equal to or greater than their processing temperature, e.g., melting and/or glass transition temperature, via first extruder 12 and second extruder 14, respectively, and then fed into feedblock 16 in the form of polymer melt streams. Feedblock 16 divides both the first polymer melt stream 28 and second polymer melt stream 30 into multiple polymer layers, which are then combined with one another to form multilayer flow stream 32. As multilayer flow stream 32 exits feedblock 16, it may optionally be fed into layer multiplier 18. Multiplier 18 splits multilayer flow stream 32 into two or more sub-streams and then may recombine one or more of the respective streams after stacking one sub-stream atop the other sub-stream to multiply the number of layers in multilayer flow stream 42.

From multiplier 18, multilayer flow stream 42 enters film extrusion die 20. Extrudate 44 from film extrusion die, which is typically in melt form, is cooled on casting wheel 22, which rotates past one or more pinning wires to pin extrudate 44 to casting wheel 22. In some cases, multilayer flow stream 42 may include one or more skin layers, e.g., to dissipate the large stress gradient found near the wall of die 20, leading to smoother extrusion of the optical layers.

From casting wheel 22, multilayer film 46 may be oriented by orienter 24. For example, orienter 24 may include a length orienter, such as pull rolls, that may stretch film 46 in the longitudinal (machine) direction. As another example, orienter 24 may include a tenter that may stretched film 46 in a transverse (cross-web) direction. In some embodiments, orienter 24 may biaxially stretch film 46, i.e., in both the machine and cross-web directions either consecutively or simultaneously. Film 46 may be stretched by the orienters according to appropriate stretch ratios depending on the properties desired for film 46. Film 46 may then be collected from orienter 24 on windup roll 26. In this manner, film line 10 may be used to manufacture multilayer polymer film 46 that includes multiple polymer layers including first polymer material 28 and multiple polymer layers including second polymer material 30.

First polymer 28 and second polymer 30 may include any appropriate polymer suitable for a multilayer polymer film. In some embodiments, first polymer 28 and second polymer 30 may include high and low index polymers, respectively, selected such that film 46 exhibits certain desirable optical and/or physical properties.

Figure 2A:
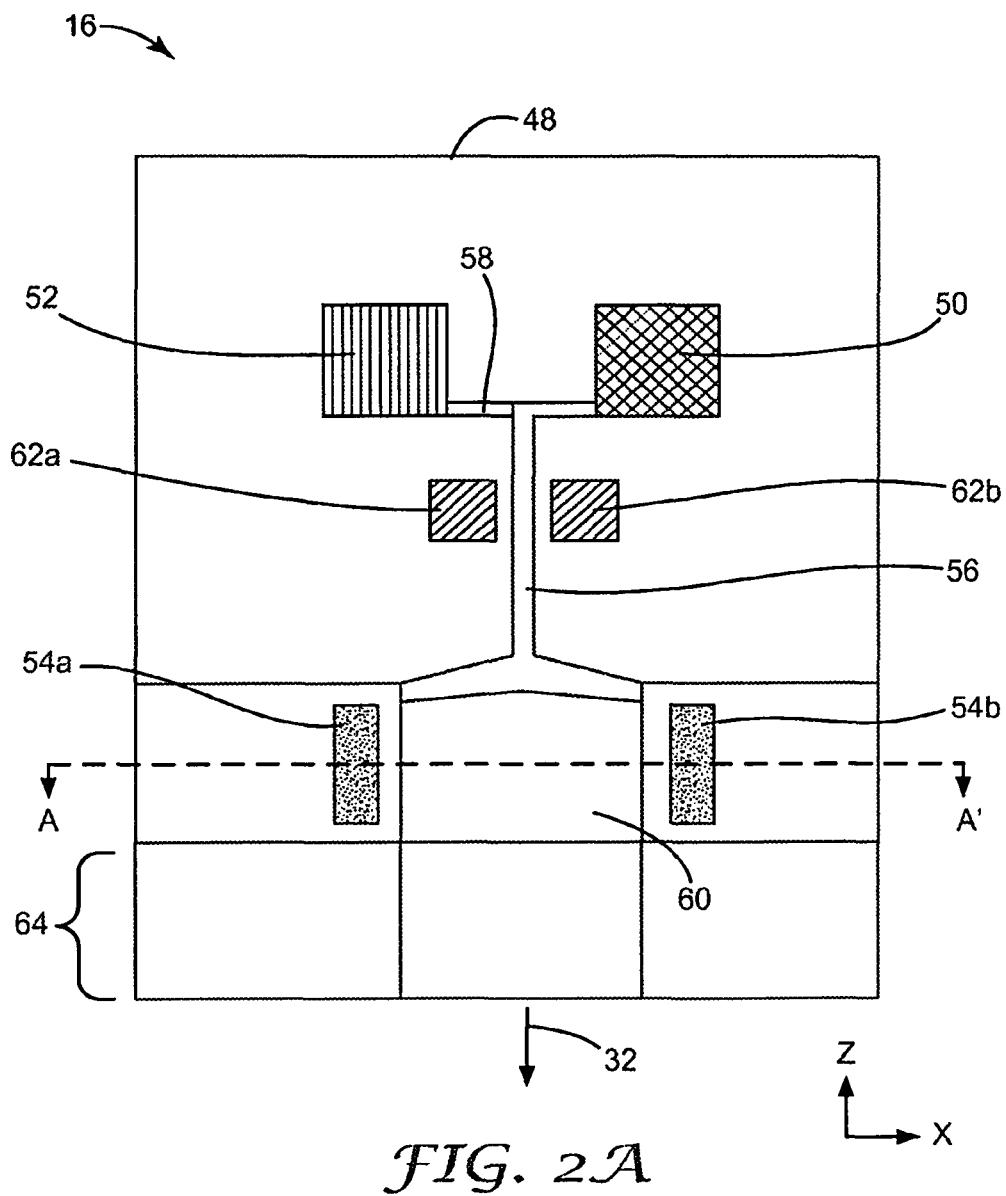
FIGS. 2A and 2B are schematic diagrams illustrating an example feedblock that may generate a multilayer polymer flow stream.
Figure 2B:
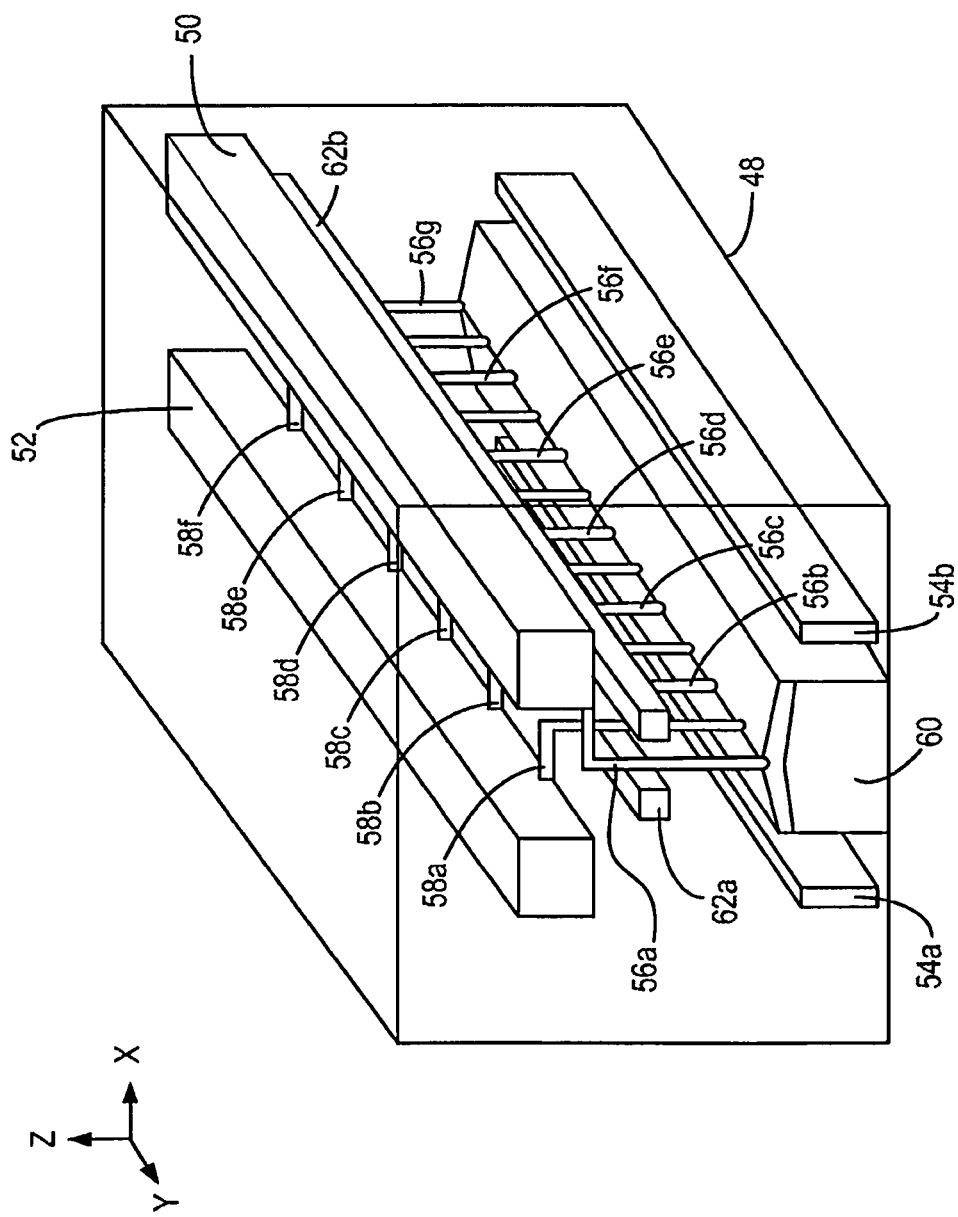

FIGS. 2A and 2B are schematic diagrams illustrating example feedblock 16 of film line 10 of FIG. 1. As shown in FIGS. 2A and 2B, feedblock 16 generates multilayer flow stream 32 from the first and second polymer materials, and includes first flow channel 50, second flow channel 52, plurality of first conduits 56a, 56b, 56c, 56d, 56e, 56f, 56g (collectively "first conduits 56"), plurality of second conduits 58a, 58b, 58c, 58d, 58e, 58f (collectively "second conduits 58"), slot die section 60, conduit heaters 62a and 62b (collectively "conduit heaters 62"), slot die heaters 54a and 54b (collectively, "slot die heaters 54"), and compression section 64 (not shown in FIG. 2B) within housing 48.

First flow channel 50 and second flow channel 52 are in fluid communication with first and second extruders 12, 14, respectively (FIG. 1), which supply first and second polymer melt streams 28 and 30 to the first and second flow channels 50, 52, respectively. First flow channel 50 is also in fluid communication with first conduits 56, and second flow channel 52 is also in fluid communication with second conduits 58. First polymer melt flows from within first flow channel 50 through first conduits 56 to slot die section 60 and second polymer melt flow from within second flow channel 52 through second conduits 58 to slot die section 60. As illustrated in FIG. 2B, first conduits 56 includes seven individual first conduits 56a, 56b, 56c, 56d, 56e, 56f, 56g and second conduits 58 includes six individual second conduits 58a, 58b, 58c, 58d, 58e, 58f. Each of the respective individual conduits may correspond to an individual polymer layer of the plurality of polymer layers in multilayer flow stream 32 generated via feedblock 16. Accordingly, in the example of FIGS. 2A and 2B, feedblock 16 forms a multilayer flow stream 32 having a total of thirteen individual polymer layers, with seven of the polymer layers including the first polymer material and six of the polymer layers including the second polymer material. However, as will be further described below, the number of individual layers of multilayer flow stream 32 formed by a feedblock is not limited to such a number.

Slot die section 60 includes a plurality of slots (shown in FIG. 3 as slots 70a through 70m, collectively "slots 70") that are in fluid communication with first conduits 56 and second conduits 58. First and second polymer melt streams flows from first conduits 56 and second conduits 58, respectively, into slots 70 of slot die section 60. The flow of the respective melt streams are re-oriented within the slots 70 according to the flow dimensions of the slots 70 to form individual polymer layers. In some embodiments, slots 70 of slot die section 60 may include an expansion manifold section configured to receive the polymer material from the first and second plurality of conduits 56 and 58 and spread the polymer melt in the width direction (x-direction) of slot die section 60 to approximately the desired width of multilayer flow stream 32 exiting feedblock 16. From the expansion manifold section, slots 70 further define a flow path to form individual polymer layers within slot die section 60.

Upon exiting slot die section 60, the polymer layers generated via slots 70 are fed into compression section 64 (shown in FIG. 2A), where the polymer layers are combined with one another to form multilayer flow stream 32 with the major plane of the polymer layers extending in approximately the cross-web direction (x-direction), i.e., the layers are stacked in approximately the y-direction as indicated in FIG. 2B. Compression section 64 may also compress the polymer layers in the transverse direction (y-direction) to decrease the thickness of multilayer flow stream 32. After being compressed in the compression section 64, the multilayer flow stream 32 generated via feedblock 16 may be further processed in film line 10, as previously described, to form multilayer film 46.

In some cases, depending on the number of individual layers desired for the manufactured multilayer polymer film, multilayer flow stream 32 generated via feedblock 16 may or may not undergo further processing to increase the number of polymer layers in the flow stream before being processed via an extrusion die. For example, multilayer flow stream 32 generated via feedblock 16 may be fed from compression section 64 to extruder 20 (FIG. 1) without being processed by multiplier 18 (FIG. 1). Alternatively, multilayer flow stream 32 may be processed by a multiplier to increase the number of layers in the flow stream that is processed by an extrusion die 20, e.g., if the number of layers in flow stream 32 generated via feedblock 16 is less than the amount desired for the multilayer film 46 being manufactured.

As illustrated in FIG. 2B, the individual conduits of first conduits 56 and second conduits 58 which feed the respective polymer melt streams into slots 70 of slot die section 60 may be interleaved along the depth (in the y-direction) of feedblock 16. Accordingly, multilayer flow stream 32 generated via feedblock 16 is formed such that the individual polymer layers substantially alternate between the first and second polymers materials. In some cases, by alternating polymers layers, e.g., especially between high and low index polymers layers, multilayer film 46 generated from multilayer flow stream 32 may exhibit one or more desirable optical properties. While the embodiment of FIGS. 2A and 2B illustrates feedblock 16 as being configured to generate multilayer flow stream 32 having thirteen individual polymer layers, embodiments are not limited to such a configuration. Instead, in some embodiments, feedblock 16 may generate multilayer flow stream 32 that includes more or less than thirteen individual polymer layers. For example, feedblock 16 may be configured such that the number of individual polymer layers in multilayer flow stream 32 may range from approximately 50 polymer layers to approximately 600 polymer layers, such as, for example, approximately 100 polymer layers to approximately 300 polymer layers.

Upon exiting feedblock 16, multilayer flow stream 32 exhibits a layer thickness profile defined by the thicknesses of the individual polymer layers within flow stream 32 that were formed via slots 70 of feedblock 16. The layer thickness profile of multilayer film 46 derived from multilayer flow stream 32 in film line 10 may depend in part on the layer thickness profile exhibited by multilayer flow stream 32. For example, if one or more changes are made to the layer thickness profile of multilayer flow stream 32, it may result in one or more changes to the layer thickness profile exhibited by multilayer film 46. As a result, the layer thickness profile of film 46 may be controlled by controlling the layer thickness profile of multilayer flow stream 32 generated via feedblock 16.

In some cases, cross-web layer thickness profile of multilayer flow 32 may be influenced by the dimensions of the flow defining sections of feedblock 16, such as, e.g., first and second flow channels 50, 52, first conduits 56, second conduits 58, slots 70 of slot die section 60, and compression section 64. Parameters such as slot height and/or length, conduit diameter, flow channel widths may be selected to provide for a certain layer thickness profile. For example, the cross-sectional area of flow channels 50 and 52 may remain constant or can change, e.g., increase or decrease in area, to provide a certain pressure gradient that, in turn, may affect the layer thickness profile of multilayer flow stream 32. In this manner, the dimensions of one or more of the flow defining sections may be designed to influence the layer thickness distribution of the multilayer flow stream generated via feedblock 16, e.g., based on a target layer thickness profile. However, as previously described, the use of such an approach to control the cross-web layer thickness profile of a film may be expensive and time consuming, while providing for substantially no adjustment capabilities during a film manufacturing run.

Additionally, or alternatively, feedblock 16 may include conduit heaters 62 located proximate first conduits 56 and/or second conduits 58, as shown in FIGS. 2A and 2B, to influence the cross-web layer thickness profile of multilayer flow 32. For example, conduit heaters 62 may include one or more cartridge heaters, called axial rod heaters, placed in bores through feedblock 16 on either side to first and second conduits 56 and 58. In such an orientation, conduit heaters 62 may selectively provide heat to the first and second conduits 56 and 58 and, thus, the polymer melt flowing within first and second conduits 56 and 58. In this manner, conduit heaters 62 may be used to control the temperature and pressure of polymer melt flowing within the first and second conduits 56 and 58, based on the amount of heat provided via conduit heaters 62, to influence the layer thickness profile of multilayer flow 32. However, the extent of the control afforded by conduit heaters 62 may be limited for a variety reasons, included those previously described herein.

Notably, in some embodiments, feedblock 16 may be configured in a manner that allows for heat to be selectively provided to some or all of slot die section 60. As shown in FIGS. 2A and 2B, feedblock 16 includes slot heaters 54 proximate to slot die section 60, which are configured to control heat flow to slot die section 60, e.g., by selectively providing heat to slot die section 60. In such a configuration, the heat provided by slot heaters 54 may be used to control the temperature of certain portions of slot die section 60 and the temperature and/or pressure of the polymer melt within one or more of slots 70 of slot die section 70, thereby influencing the flow characteristics of the polymer melt within one or more of slots 70 and, in some cases, the layer thickness profile of one or more layers formed via slots 70 of slot die section 60.

Figure 3:
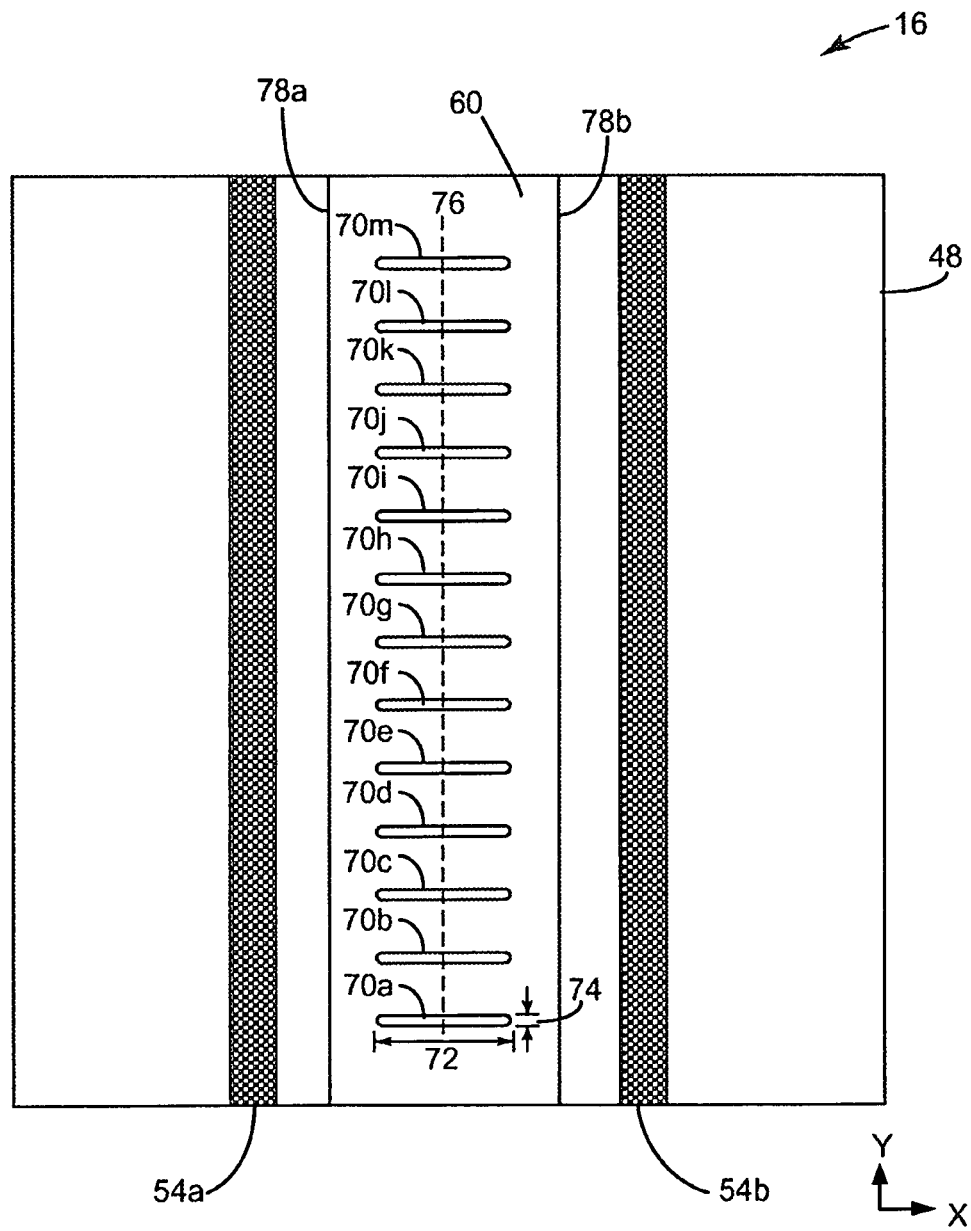
FIG. 3 is a schematic diagram illustrating a cross-sectional view of the example feedblock of FIGS. 2A and 2B along line A-A' shown in FIG. 2A.

FIG. 3 is a schematic diagram illustrating a cross-sectional view of the example feedblock 16 of FIGS. 2A and 2B along line A-A' shown in FIG. 2A. In particular, FIG. 3 further illustrates slots 70 of slot die section 60, and the configuration of slot heaters 54a and 54b relative to slot die section 60 within housing 48 of feedblock 16.

Slot die section 60 includes thirteen individual slots 70a-70m that form thirteen individual polymer layers from the polymer materials received from first conduits 56 and second conduits 58, as previously described. Specifically, slot 70a forms a polymer layer from first polymer melt stream 28 received from first conduit 56a, slot 70b forms a polymer layer from second polymer melt stream 30 received from second conduit 58a, slot 70c forms a polymer layer from first polymer melt stream 28 received from second conduit 58b, slot 70d forms a polymer layer from second polymer melt stream 30 received from second conduit 58b, slot 70e forms a polymer layer from first polymer melt stream 28 received from first conduit 56c, and so forth. In general, the dimensions of each of the slots 70, e.g., length 72 and width 74 of slot 70a, defines the flow of the respective polymer melt streams within the slots to from the respective polymer layers, and may influence the thickness profile of the polymer layer in the cross-web direction within multilayer flow stream 32 generated via feedblock 16. As shown, slots 70 may be aligned along central axis 76 corresponding to the center of multilayer flow stream 32 in the cross-web direction.

Slot heaters 54a and 54b reside proximate first plate edge 78a and second plate edge 78b (collectively "plate edges 78"), respectively, of slot die section 60 within the housing 48 of feedblock 16, and extend substantially the entire length of slot die section 60, or at least the length of slot die section containing slots 70, in a direction normal to the layer plane. The proximity of slot heaters 54 to slot die section 60 allows slot heaters 54 to influence the temperature and pressure of the polymer melt within one or more of slots 70 within slot die section 60 by providing heat to slot die section 60.

In some embodiments, the position of slot heaters 54 adjacent to plate edges 78 allows slot heaters 54 to apply localized heat to the edges 78 of slot die section in a manner that creates a temperature gradient extending from the edges 78 of slot die section 60 towards the center. As a result, the heat provided via slot heaters 56 may cause the temperature of the polymer melt within one or more slots 70 to be greater at an edge of the respective slot, i.e., the portion of slots 70 nearest plate edge 78a or 78b, than the temperature of the polymer melt near the center of the respective slot, thereby promoting more polymer melt flow to the edge of the respective slot compared to the center. In this manner, the heat provided to slot die section 60 via slot heaters 54 may be used to control the thickness of one or more of the polymer layers formed by one or more slots 70 of slot die section 60 relative to the center of the layer(s) in the cross-web direction and, more generally, to control the cross-web layer thickness profile of multilayer flow stream 32. Such control may be particularly useful in non-multiplied multilayer film that may possess a cross-web layer thickness profile that is approximately symmetric relative the center of the cross-web.

Slot heaters 54 may include any type of heater suitable for providing heat to one or more slots 70 of slot die section 60 as described herein, e.g., cartridge type heaters (e.g., rod and/or pencil heaters) shaped to fit within one or more bores in feedblock 16 proximate to slot die section 60. In some embodiments, slot heaters 54 may be configured to provide an adjustable heat flow to slot die section 60 to provide for better temperature control within slot die section 60. For example, the relative amount of heat provided to slot die section 60 by slot heaters 54 may depend on the relative amount of power provided to the respective heater. In such cases, the amount of heat provided to slot plate 60 by heater 54a and/or 54b may be adjusted by adjusting the power supplied to the respective heater.

In some embodiments, slot heaters 54 may selectively provide heat along the length (y-direction) of slot die section 60 according to multiple temperature control zones created relative to slot die section 60. For example, slot heaters 54 may be configured such that heat flow may be separately provided to only a portion of edge 78a proximate to slots 70a and 70b, rather than along the entire edge 78a of slot die section 60. As such, slot heaters 54 may create a temperature gradient primarily within slots 70a and 70b to influence the thickness of the polymer layers created within the respective slots 70a and 70b, rather than all slots 70 within slot die section 60. In this manner, slot heaters 54 may control heat flow to slot die section 60 by providing heat to only certain sections of slot die section 60 and/or by providing heat to separate sections of slot die section 60 in varying amounts.

To create multiple temperature controlled zones along the length of slot die section 60, slot heaters 54 may include any type of heater that can provide a temperature gradient or a multiplicity of discrete temperatures along its length, either by variation in electrical resistance along its length, by multi-zone control, or by any other suitable means known in the art. In some embodiments, slot heater 54a and slot heater 54b may include multiple separate heaters proximate edges 78a and 78b, respectively, that individually extend only a portion of the entire length of slot die section 60. Each of these separate heaters may be configured to provide heat to certain portions of slot die section 60 independently or semi-independently from one another. In such a configuration, slot heaters 54 may create multiple temperature control zones along the length of slot die section 60 in which heat may be provided to the portion of slot die section 60 corresponding to the control zone separate from that of the other control zones.

In general, the more temperature control zones provided for by slot heaters 54, the more precisely the temperature within slot die section 60 may be controlled, thereby allowing for more precise control of the cross-web layer thickness profile.

The temperature gradient created by slot heaters 54 within one or more slots 70 of slot die section 60 depends at least in part on the location and/or amount of heat supplied from heaters 54 to slot die section 60. Furthermore, the temperature gradient may be influenced by the properties of the polymer melt within the respective slot. For example, if the heat capacity of the first polymer material 28 is different than the heat capacity of the second polymer material 30, the temperature gradient within a slot containing the first polymer melt stream may be different than the temperature gradient within a slot containing the second polymer melt stream. In any case, slot heater 54 may provide an amount of the heat capable of generating a temperature gradient in the polymer melt along the length of one or more slots that is sufficient to promote flow to one or a portion of the slot over another.

Figure 4:
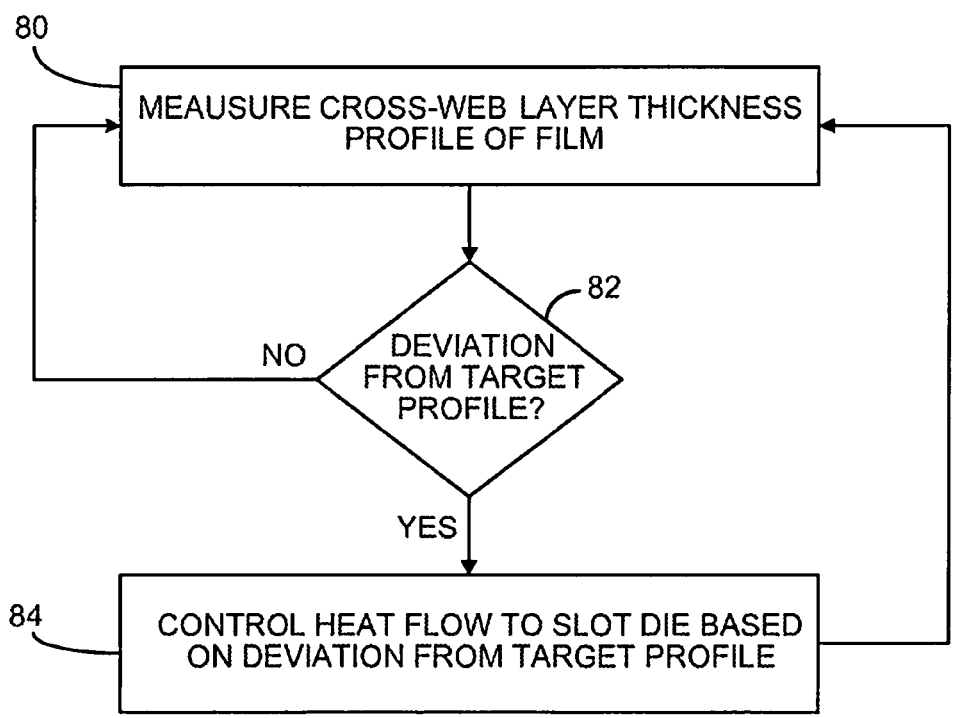
FIG. 4 is an example flow chart illustrating an example technique for controlling the cross-web layer thickness profile of a multilayer film.

FIG. 4 is a flow chart illustrating an example technique for controlling the cross-web layer thickness profile of a multilayer film by controlling heat flow to one or more slots within a feedblock configured to generate a multilayer polymer flow stream. Such a technique may be utilized, for example, to control the cross-web layer thickness profile of multilayer film 46 generated via film line 10 of FIG. 1.

During a film manufacturing run, the cross-web layer thickness profile of multilayer film 46 may be measured via any suitable means 80. For example, film line 10 may include a monitoring device 86 (FIG. 1) between orienter 24 and wind-up roll 26 that is configured to measure all or a portion of the cross-web layer thickness profile of multilayer film 46 on a substantially continuous or periodic basis. In some cases, monitoring device 86 may directly determine the cross-web layer thickness profile of film 46, e.g., by measuring the physical thickness of film 46. For example, measurement of the physical thickness of a film can be done using online traversing beta gauge scanning devices, such as those available from Honeywell International, Inc., Morristown, N.J., USA, under the trade designation Measurex. Other caliper gauges include without limitation beta transmission gauges, X-ray transmission gauges, gamma backscatter gauges, contact caliper sensors, and laser caliper sensors. Such gauges are commercially available, for example, from NDC Infrared Engineering, Irwindale, Calif., USA. Additionally, or alternatively, monitoring device 86 may indirectly determine the cross-web layer thickness profile of film 46, e.g., by measuring the optical characteristics of film 46 relative to the cross-web direction. Since one or more optical properties of film 46 may depend on the layer thickness profile of film 46, the layer thickness profile of film 46 may be gauged based on measurement of such optical properties. In any case, monitoring device 86 may be configured to determine the cross-web layer thickness profile of a film at least to the extent necessary to control heat flow to slot die section 60 via slot heaters 54 as described herein.

Based on the cross-web layer thickness profile of film 46 measured via monitoring device 86, it may be determined that one or more deviations in the measured cross-web thickness profile of film 46 from a target cross-web layer thickness profile exist (80), e.g., by comparing the measured profile to the target profile. The target cross-web layer thickness profile may define a cross-web layer thickness profile possessed by a film which exhibits one or more desired optical and/or physical properties. Accordingly, if the measured cross-web layer thickness profile of film 46 is consistent with that of the target profile, or at least within a certain tolerance, film 46 may exhibit one or more desired optical and/or physical properties. In such cases, the existing controllable parameters of film line 10, including heat flow to slot die section 60, may be maintained at their current settings, and monitoring device 86 may continue to measure the cross-web layer thickness profile to identify any changes to the profile that may be characterized as a deviation from the target profile.

However, if it is determined that the measured cross-web layer thickness profile deviates from the target profile, the heat flow to slot die section 60, which includes plurality of slots (70), may be controlled based at least in part on the profile deviations (84), e.g., to "tune" the cross-web layer thickness profile of film 46 to be consistent with that of the target profile. When one or more deviations from the target profile are present, film 46 may fail to exhibit the one or more desirable properties corresponding to the target profile, and/or may even exhibit one or more undesirable properties. For at least the reasons previously described, providing heat flow to slot die section 60 may influence one or more properties of multilayer flow stream 32 and film 46, including the respective cross-web layer thickness profiles. Using this relationship, the cross-web layer thickness may be adjusted or "tuned" by controlling heat flow to slot die section 60 via one or more of heaters 54 to tailor the cross-web layer thickness profile of film 46 to be consistent with that of the target profile.

In some embodiments, controlling heat flow to slot die section 60 (84) may include initiating heat flow to one or more portions of slot die section 60. For example, heat flow of to slot die section 60 may be initiated by supplying an appropriate amount of power to one or more of heaters 54 associated with one or more temperature control zones affecting one or more slots 70 of slot die section 60. The new heat flow that is provided to slot die section 60 influences one or more properties of the polymer melt within the affected slots 70 in a manner that adjusts the cross-web layer thickness profile of film 46 to be consistent with that of the target profile, e.g., by promoting polymer melt flow toward the proximate edge of the one or more affected slots 70.

Additionally, or alternatively, controlling heat flow to slot die section 60 (84) may include adjusting heat flow to one or more portions of slot die section 60 that is already being supplied to slot die section 60 via one or more of heaters 54. In some cases, the heat flow may be increased or decreased by making appropriate adjustments to the power being supplied to heaters 54 to increase or decrease the heat generated by the heaters. Such heat flow adjustments may be configured to influence one or more properties of the polymer melt flow within one or more of slots 70 of slot die section 60 in a manner that adjusts the cross-web layer thickness profile of film 46 to be consistent with that of the target profile, e.g., by promoting or discouraging polymer melt flow toward the proximate edge of the one or more affected slots 70.

Additionally, or alternatively, controlling heat to slot die section 60 (84) may include terminating heat flow to one or more portions of slot die section 60. For example, one or more of heaters 54 may be turned off to terminate the heat flow that the heater was providing to slot die section 60. The termination of the heat flow from one or more of heaters 54 may be configured to influence one or more properties of the polymer melt flow within one or more of slots 70 of slot die section 60 in a manner that adjusts the cross-web layer thickness profile of film 46 to be consistent with that of the target profile.

In some embodiments, one or more steps may be taken to calibrate the influence that heat flow provided to slot die section 60 via heaters 54 has on the cross-web layer thickness profile of film 46. For example, one or more "bump" tests may be carried out in which a certain heat flow is provided by one or more of heaters 54 to one or more portions of slot die section 60 while monitoring the cross-web layer thickness profile to determine if the heat flow influenced the cross-web layer thickness profile and, if so, the location and/or magnitude of the changes that the "bump" had on the cross-web profile. The results of one or more "bump" tests may then be utilized to determine how the heat flow may be controlled to properly address certain deviations from a target profile.

Depending in part on the configuration of film line 10, the heat flow provided to slot die section 60 may be manually and/or automatically controlled via one or more suitable control techniques. For example, during a film run, one or more human operators may manually control the heat flow provided to slot die section 60 via heaters 54 to influence the cross-web layer thickness profile of film 46, e.g., by manually adjusting the amount of power supplied to heaters 54. For example, the one or more operators may control the heat flow provided to slot die section 60 based on a trial and error technique, e.g., by making one or more educated adjustments to the heat flow and monitoring the changes to the cross-web layer thickness profile resulting from the adjustments, to tailor the cross-web layer thickness profile to a target profile. In some cases, the one or more operators may control the heat flow provided to slot die section 60 based on information gathered during calibration testing and/or previous film runs.

Additionally, or alternatively, one or more automated control systems implementing appropriate control techniques may be used to automatically or semi-automatically control the heat flow provided to slot die section 60. For example, film line 10 may further include a control device that links the difference in the current optical characteristics of film 46 with the desired optical characteristics as an input parameter to a standard proportional-integral-derivative (PID) type tuning loop that controls the individual heat zones within the feedblock. Additionally or alternatively, a similar control device may be incorporated that operates based on one or more physical properties of a film, e.g., film thickness.

Although specific embodiments of systems, devices and techniques for controlling one or more properties of a multilayer film by controlling heat flow to one or more slots have been described herein, the scope of the present disclosure is not limited as such. For example, while feedblock 16 may be described as including heaters 54*a* and 54*b* proximate both sides of slot die section 60, in some embodiments, feedblock 16 may only include a source capable of providing heat flow proximate one edge of slot die section 60, e.g., only heater 54*a*, rather than both edges. In such a configuration, heater 54*a* may still be able to provide heat flow to slot die section 60 in a manner that influences the cross-web layer thickness profile control of film 46, although the extent of the influence may be more limited than that of embodiments employing heaters on both sides of slot die section 60.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software that includes instructions to execute the techniques may be initially stored in a computer-readable medium and loaded and executed by a processor. Accordingly, this disclosure also contemplates computer-readable media including instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

EXAMPLE

A series of tests were conducted to evaluate the influence that the provision of heat to selected portions of a slot die section within a feedblock had on the cross-web layer thickness profile of a multilayer film. A film line configured the same or similar to that of film line 100 of FIG. 1 was used to manufacture a multilayer film having 275 polymeric layers alternating between CoPen (copolymers of polyethylene napthalate) and SA115, (a PC:PCTg alloy commercially available through Eastman Chemical of Kingsport, Tenn.). The film line included a feedblock substantially similar to feedblock 16 of FIGS. 2A and 2B that generated a multilayer polymer flow from which the multilayer film was derived. Unlike feedblock 16 of FIGS. 2A and 2B, the feedblock used for testing was configured to generate a multilayer polymer flow having 275 polymer layers using a slot die section that included 275 individual slots to form the respective layers. Notably, the generated multilayer flow stream was not processed via a multiplier device to multiply the layers in the resulting multilayer film, but instead the number of polymer layers in the multilayer film was substantially the same as the number of polymer layer in the multilayer flow stream generated by the feedblock.

Figure 5:
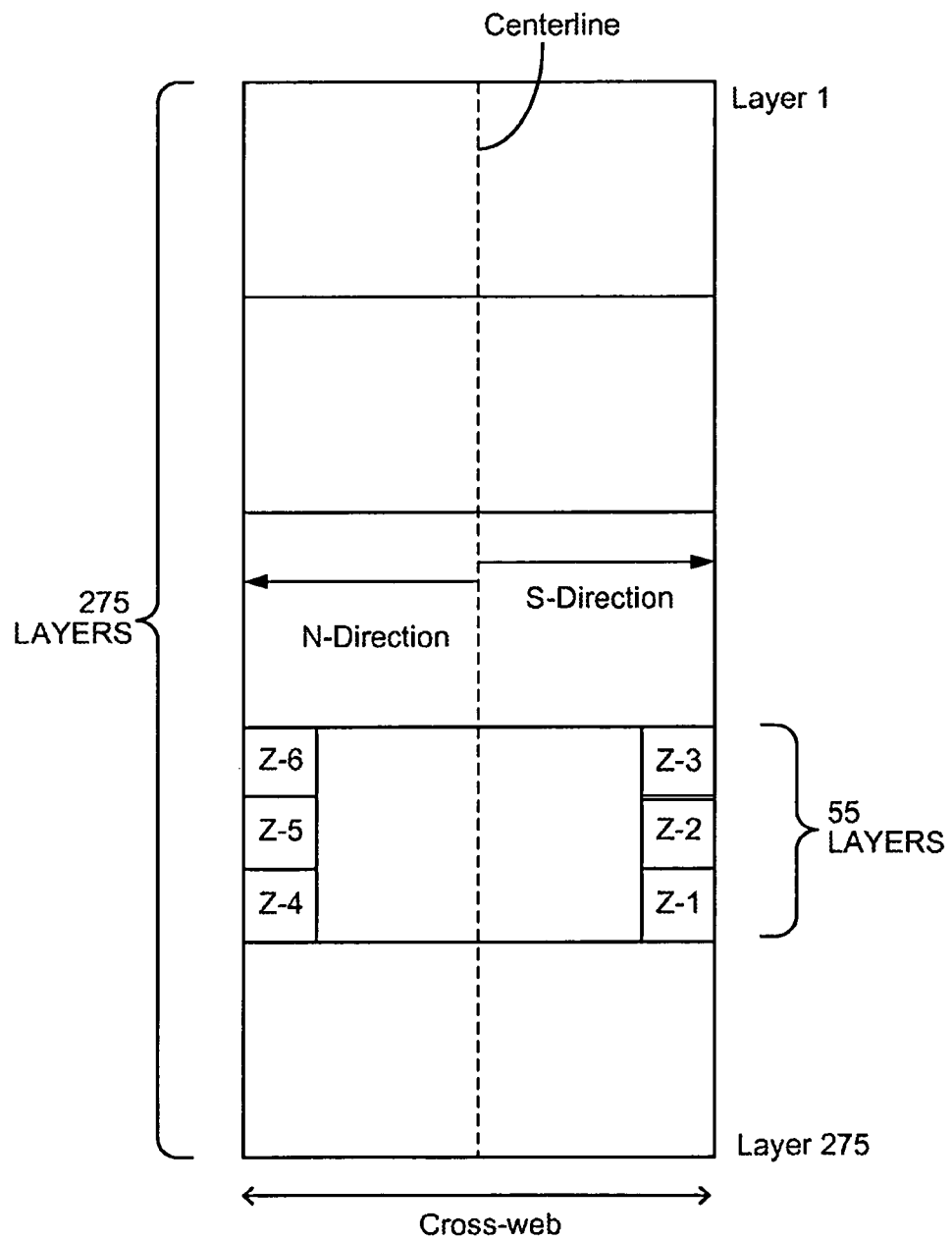
FIG. 5 is a conceptual diagram illustrating the example feedblock configuration used for a series of "bump" tests to evaluate the influence that providing heat flow to a slot die section had on a multilayer film.
Figure 6A:
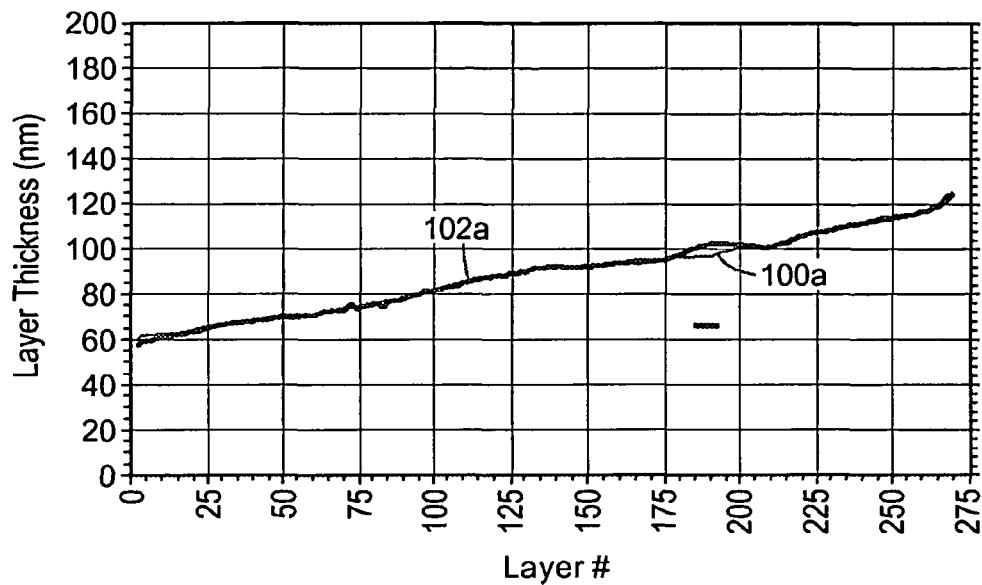
Figure 6B:
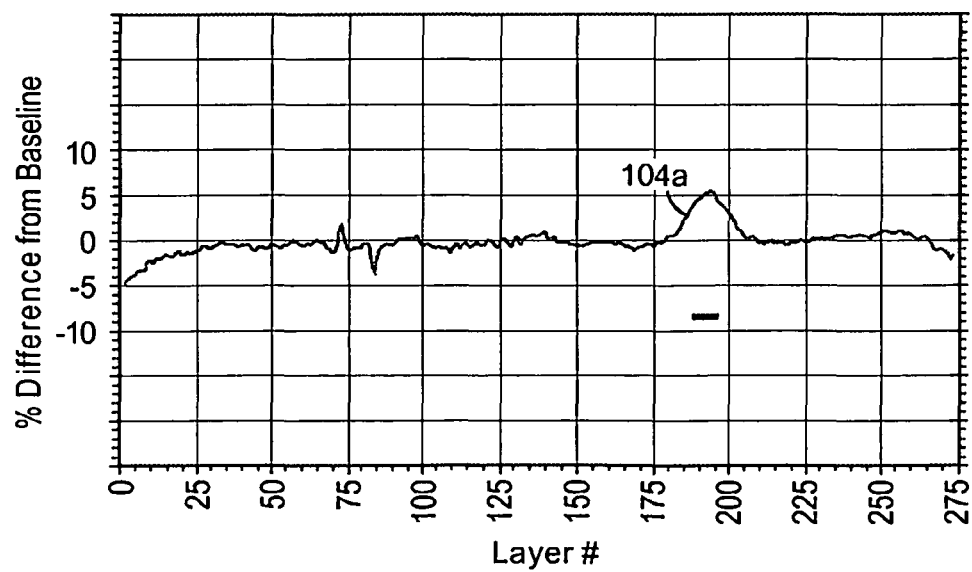
Figure 7A:
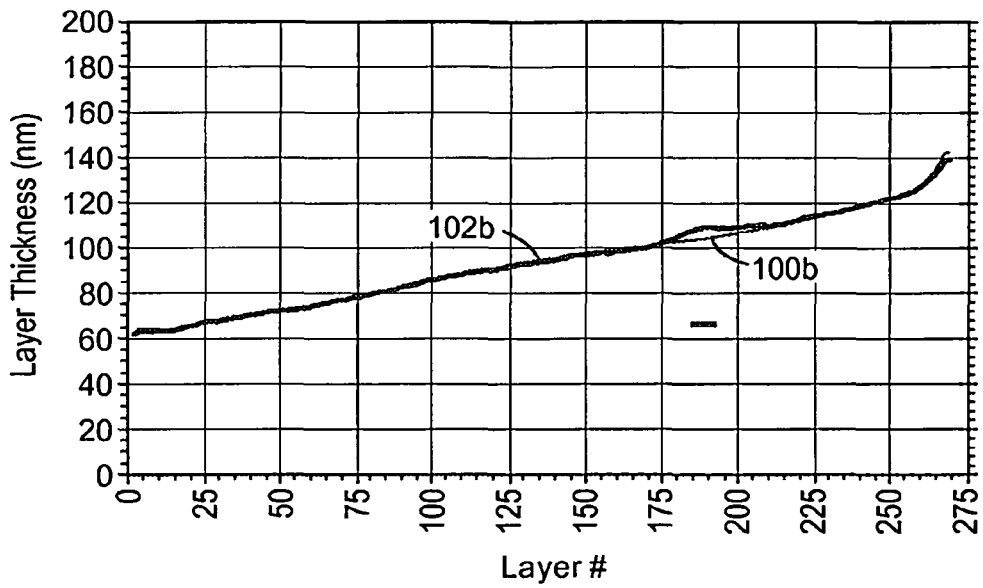
Figure 7B:
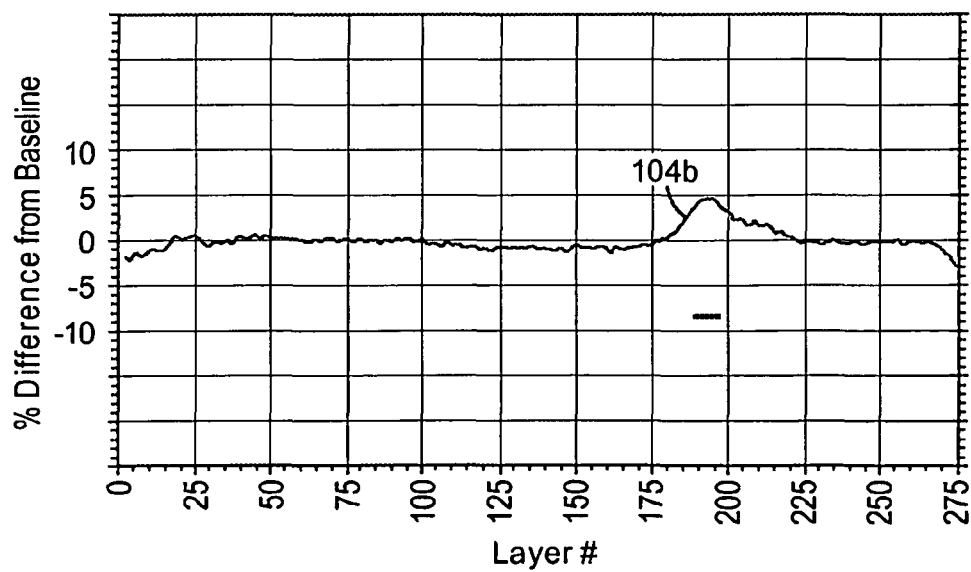
Figure 8A:
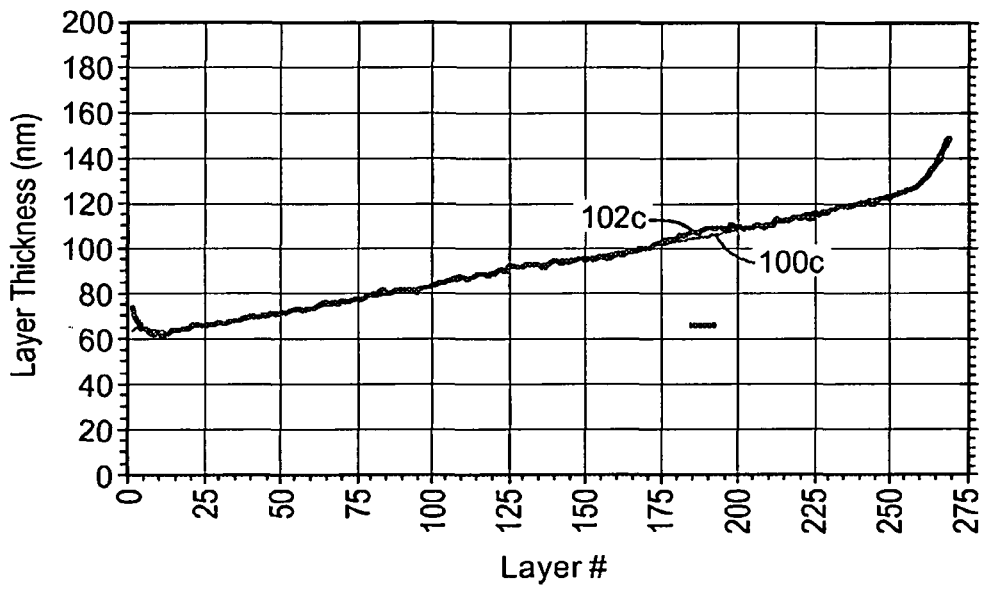
Figure 8B:
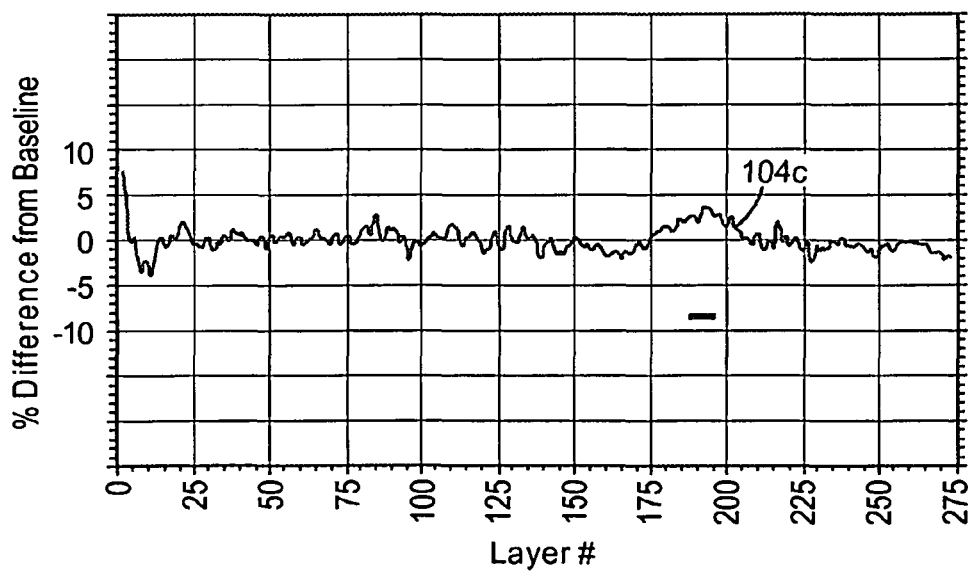
Figure 9A:
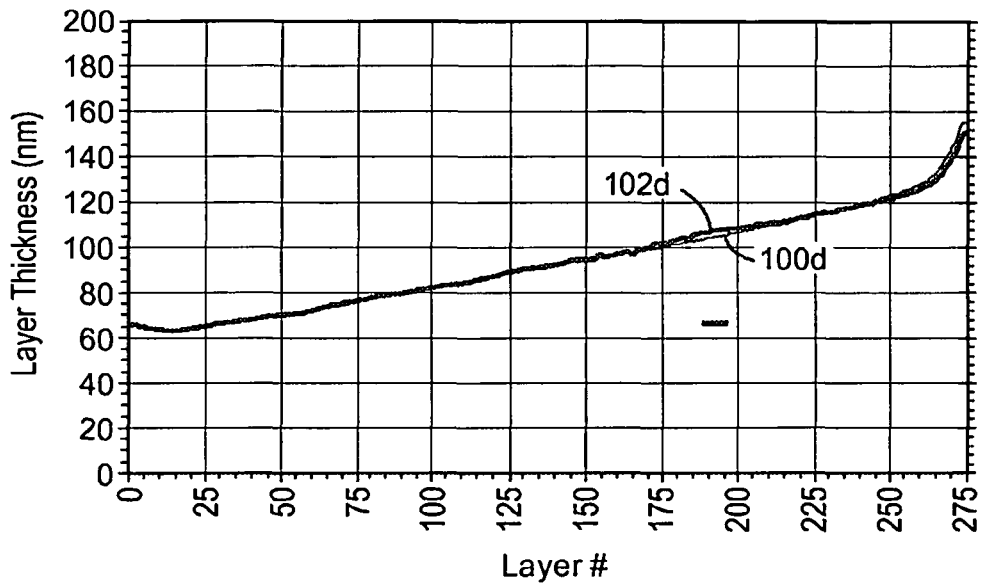
Figure 9B:
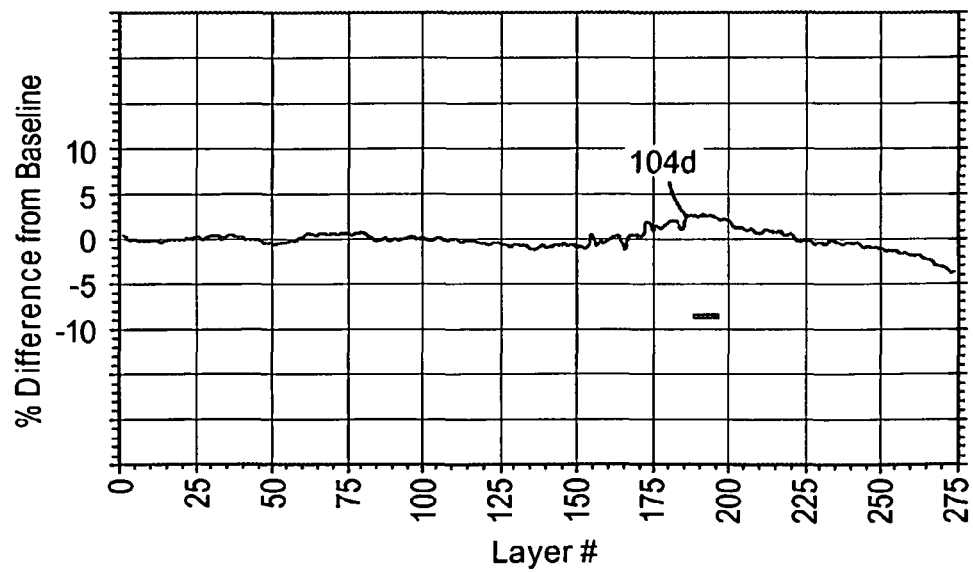
Figure 10A:
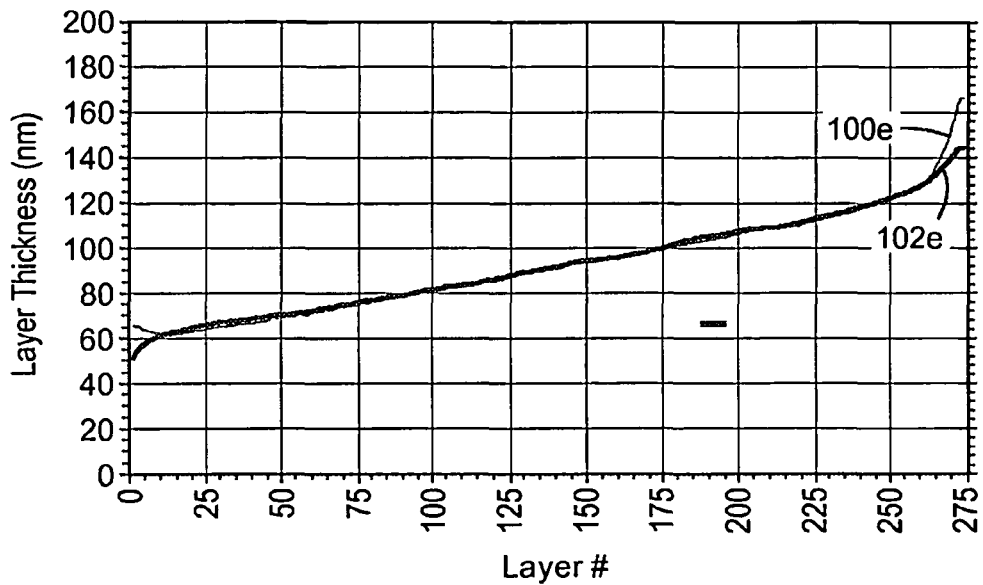
Figure 10B:
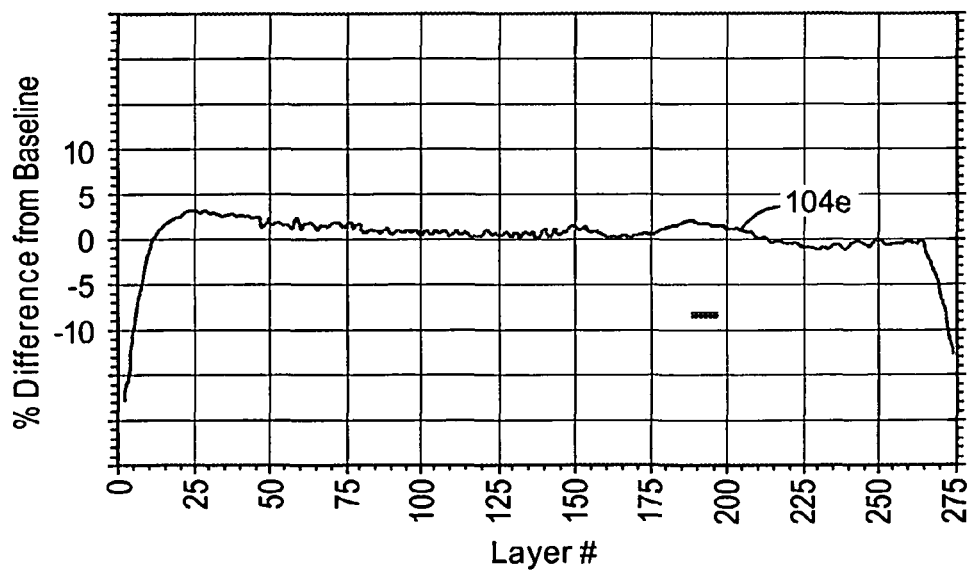
Figure 11A:
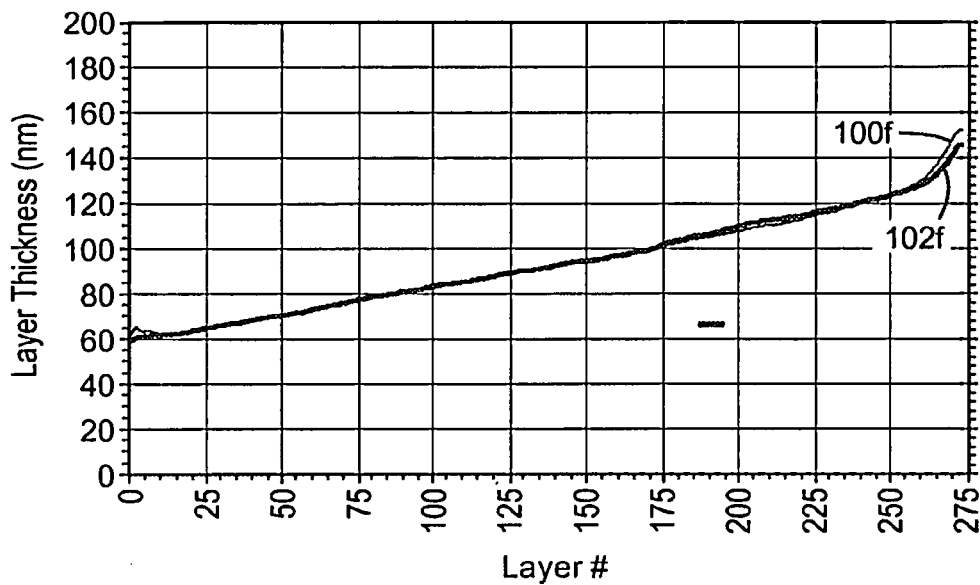
Figure 11B:
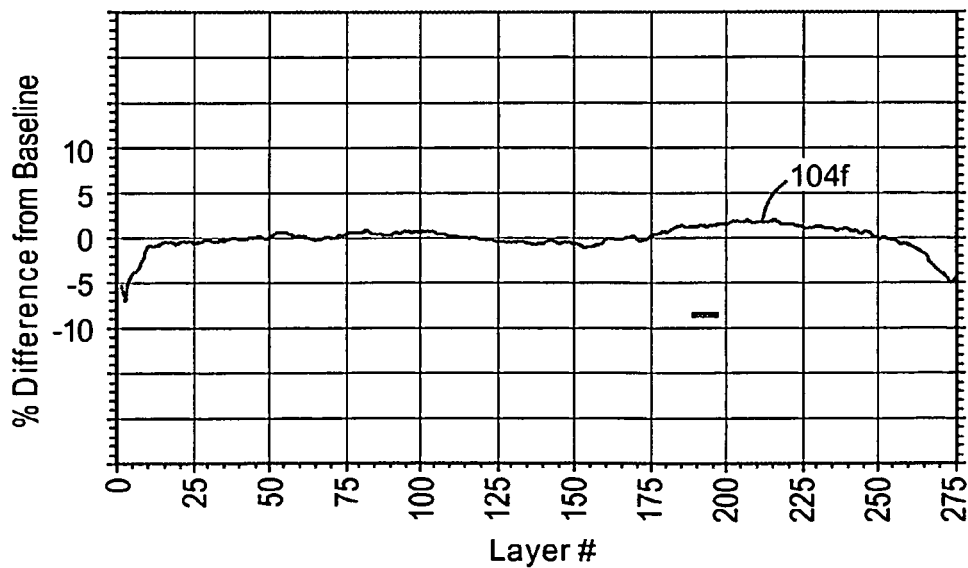
Figure 12A:
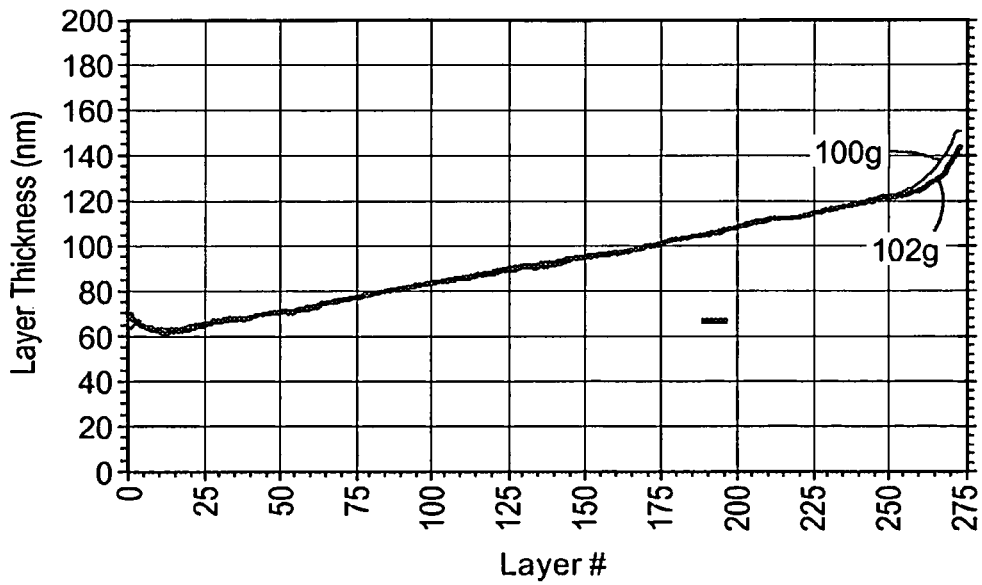
Figure 12B:
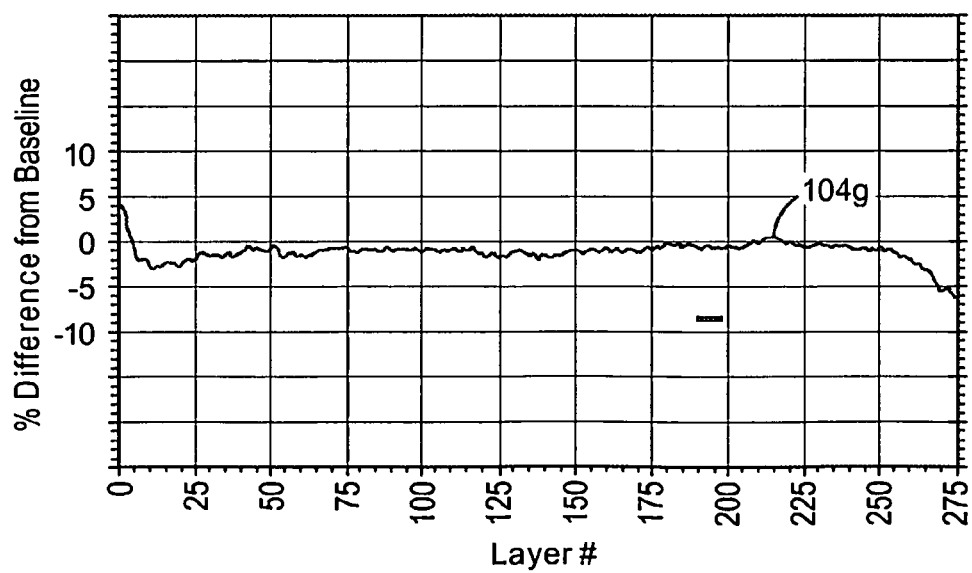
Figure 13A:
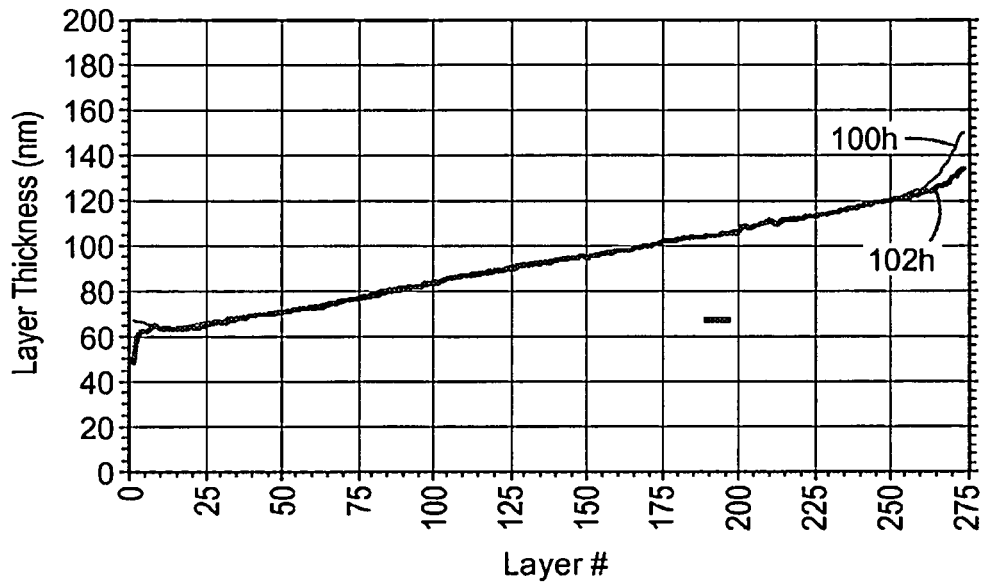
Figure 13B:
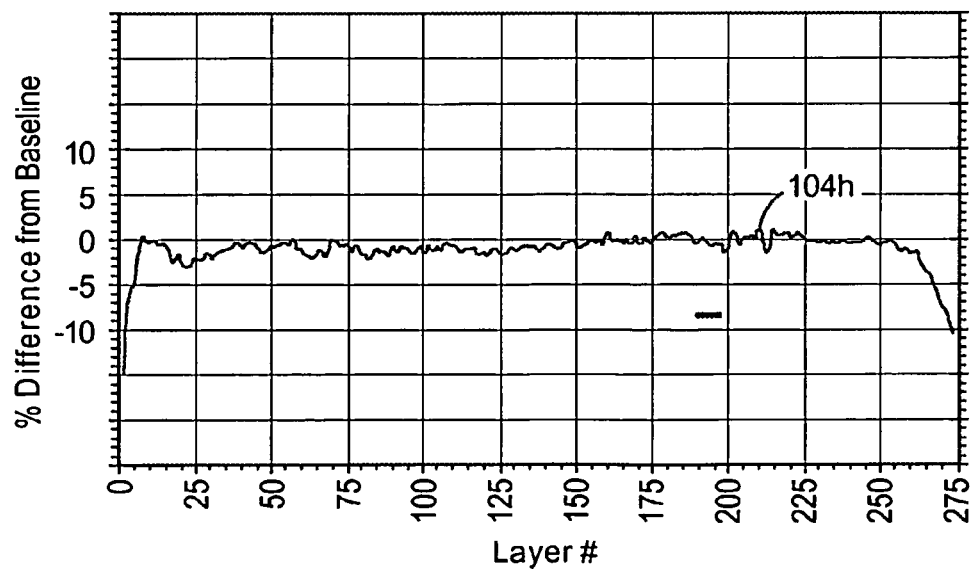
Figure 14A:
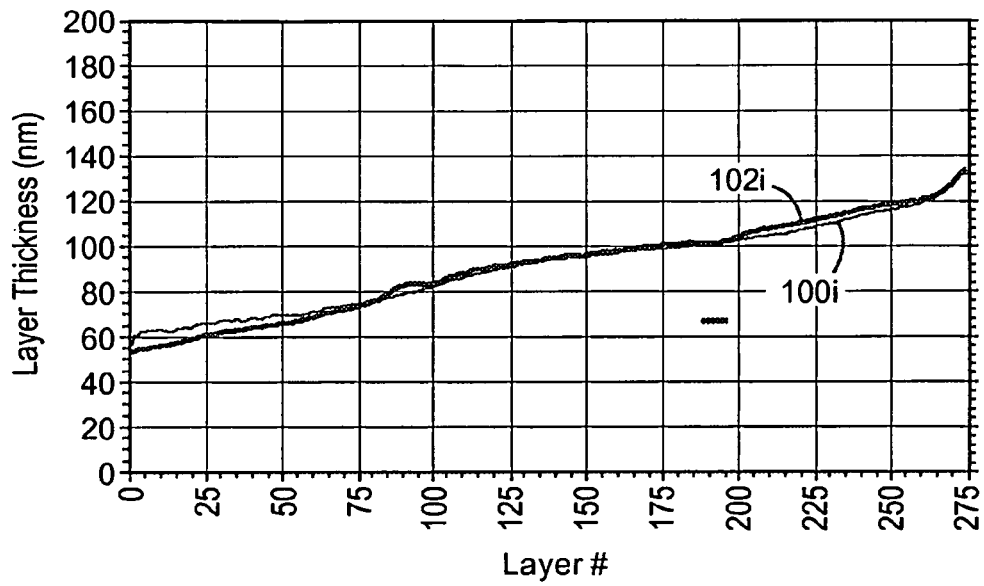
Figure 14B:
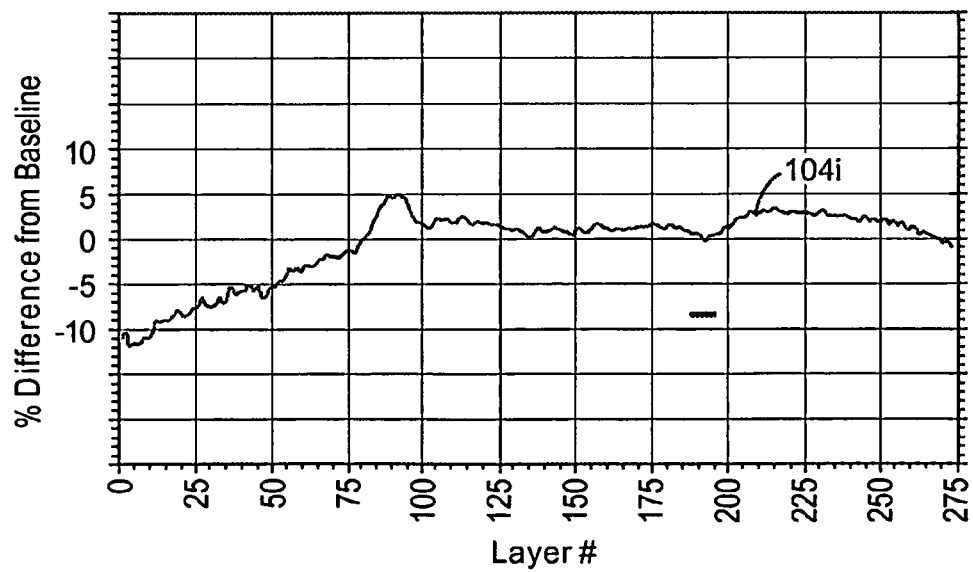

FIG. 5 is a conceptual diagram illustrating the feedblock configuration used to test the influence of heat provided by the pencil heaters to the edge of a slot die section on the cross-web profile of a multilayer film. As previously described, the film line was configured to generate a multilayer film having 275 polymer layers. The feedblock included multiple pencil heaters residing proximate both edges of the slot die section. Each pencil heater was configured to provide heat flow to the slot die section based on the amount of power supplied to the respective heater.

As indicated by FIG. 5, the configuration of the respective heaters with respect to slot die section allowed for six temperature control zones (Z-1 through Z-6) roughly corresponding to a total of 55 layers out of the 275 overall layers. Based on the six temperature control zones, a series of "bump" tests were carried out to determine the influence that the provision of heat flow had on the cross-web layer thickness profile of resulting multilayer film. Table 1 below summarizes the conditions for each test carried out.

TABLE 1

Percentage of Power Supplied to Pencil Heater by Zones

| Test No. | Z-1 | Z-2 | Z-3 | Z-4 | Z-5 | Z-6 |
|---|---|---|---|---|---|---|
| 1 | 0 | 0 | 0 | 0 | 33 | 0 |
| 2 | 0 | 0 | 0 | 0 | 66 | 0 |
| 3 | 0 | 0 | 0 | 0 | 99 | 0 |
| 4 | 0 | 0 | 0 | 99 | 66 | 33 |
| 5 | 99 | 66 | 33 | 99 | 66 | 33 |
| 6 | 33 | 66 | 99 | 99 | 66 | 33 |
| 7 | 0 | 0 | 0 | 33 | 66 | 99 |
| 8 | 33 | 66 | 99 | 33 | 66 | 99 |

For each of the test conditions listed in Table 1, after the system had reached steady state under the respective test condition, a sample of the multilayer film was extracted to determine the influence that the heat provided by the heaters proximate the slot die section had on the multilayer film. With each sample, the thickness profile of the film was measured at 9 separate locations in the cross-web direction of the film. In particular, the thickness profile was measured at distances of about 27 inches, about 20 inches, about 13.5 inches, about 7 inches in both the S and N directions (as indicated in FIG. 5) relative to the approximate cross-web centerline. The thickness profile at each location was then compared to a baseline thickness profile for the respective location that was measured prior to the start of the testing with the center tuned to exhibit a flat spectral response from approximately 400 to 900 nanometers.

FIGS. 6A-14A are plots of the baseline thickness profiles 100a-i, respectively, when heat was provided to the slot die section edge and the experimental thickness profiles 102a-i, respectively, measured for Test No. 1 listed in Table 1, i.e., 33% power in Zone 5, for each respective location on the cross-web of the film. Table 2 below summarizes the cross-web measurement location for each of FIGS. 6A-14A.

TABLE 2

Experimental Measurement Locations

| FIGURE | Measurement Location relative to Center of Cross-Web (approximately) |
|---|---|
| 6A | 27 inches from center in N-direction |
| 7A | 20 inches from center in N-direction |
| 8A | 13.5 inches from center in N-direction |
| 9A | 7 inches from center in N-direction |
| 10A | Center |
| 11A | 7 inches from center in S-direction |
| 12A | 13.5 inches from center in S-direction |
| 13A | 20 inches from center in S-direction |
| 14A | 27 inches from center in S-direction |

FIGS. 6B-14B are plots illustrating the percent difference 106a-i, respectively, between the baseline profile and experimental thickness profile relative to the layer number of the film for each respective location corresponding to FIGS. 6A-14A.

As illustrated by FIGS. 6A-14A and 6B-14B, the heat provided to the edge of the slot die section via the slot rod heaters changed the layer thickness profile of the film from the baseline profile. Changes to the thickness profile were particularly prevalent in the layers corresponding to Zone 5, i.e., the zone in which the heat was provided to the edge of the slot die section, which approximately corresponded to layers 185 through 205. Furthermore, the results also indicate that the magnitude of the changes was the greatest at the cross-web location nearest the slot edge that the heat was provided, i.e., the measurement location approximately 27 inches from center in the N-direction, and decreased as the location moved towards the opposite location on the cross-web.

This process was repeated for each remaining bump test listed in TABLE 1, i.e., Tests Nos. 2-9. The results of each respective test were then analyzed similar to the results of Test No. 1 to determine the magnitude and area of influence that the each set of conditions had on the cross-web layer thickness profile of the multilayer film.

Figure 15:
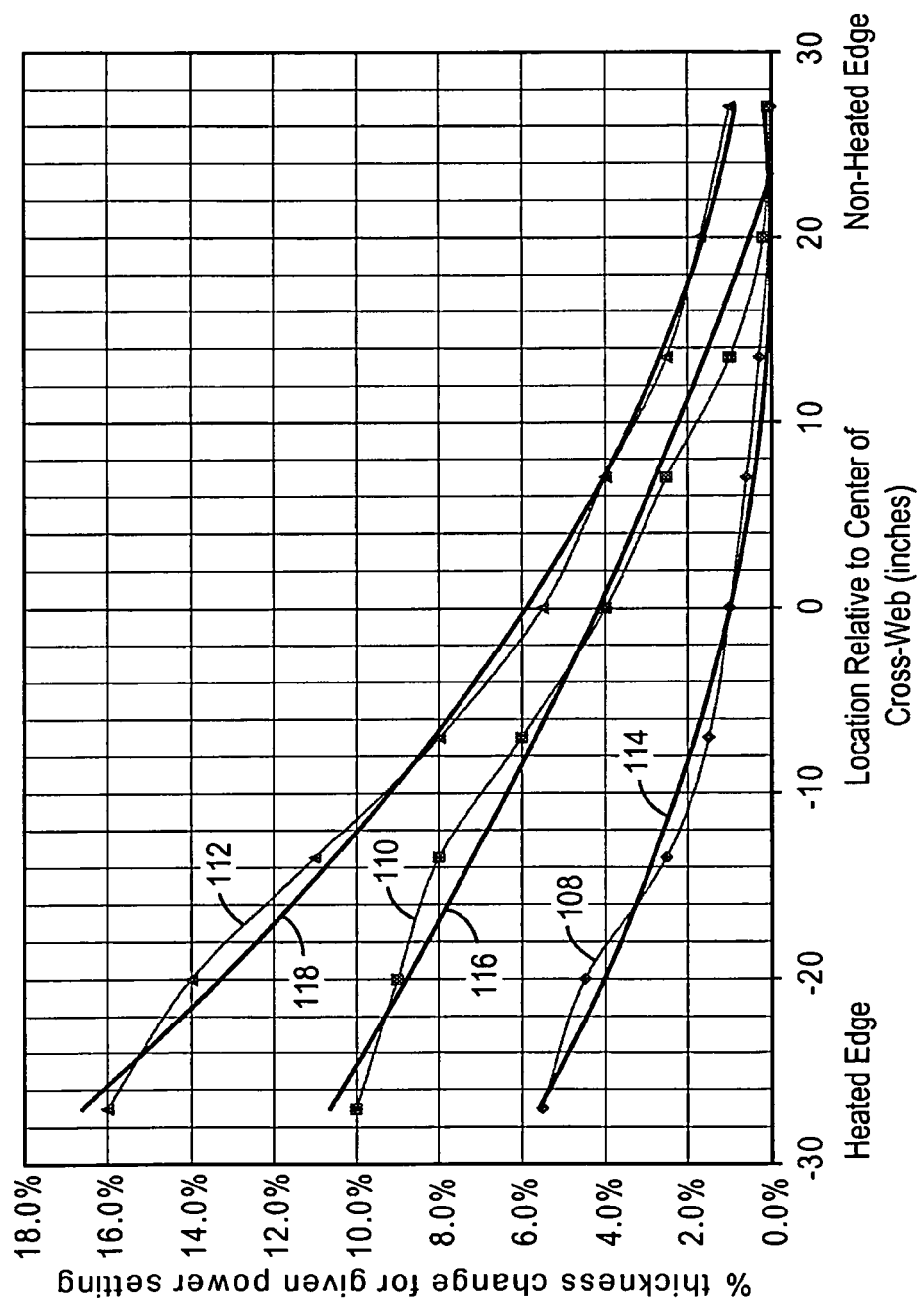
FIG. 15 is a plot illustrating the influence that heat flow had on the polymer layers associated with the zone that heat flow was provided to for a series of bump tests.

FIG. 15 is a plot illustrating the influence that the provided heat flow had on the layers associated with the zone that the heat flow was provided to in each test. In particular, lines 108, 110, 112 are plots of the influence that the heat flow corresponding to 33%, 66%, 99% power, respectively, supplied to the heater had on the particular layers associated with the respective zone relative to the cross-web location.

As shown in FIG. 15, in each case, the heat flow provided to the slot die section influenced the particular layers in the multilayer film associated with the zone the heat was provided. In general, the thickness of each layer increased relative to the measured baseline thickness, and the magnitude of the thickness increase decreased moving from the cross-web edge that the heat was provided to towards the opposite cross-web edge. Furthermore, the results illustrate that as the heat flow was increased, e.g., from 33% to 66% to 99%, the greater the influence the heat flow had on the layer thickness.

Using the experimental data illustrated in FIG. 15, a two step, second power regression was used to fit polynomial curves to lines 108, 110, 112, which are shown as curves 114, 116, 118, respectively. Based on the 2" order polynomial curves 114, 116, 118 fit to the experimental data, a relationship was identified such that the coefficients of the 2" order polynomial equations defining curves 114, 116, 118 were dependent on the power setting, (33%, 66%, and 99% in the "bump" tests). Such a relationship indicated that the magnitude of thickness change and depth of influence relative the cross-web direction could be controlled with one control input variable, i.e., the power setting for each zone.

This regression relationship was then applied to the baseline layer profile utilizing a fifteen point curve, from cross-web edge of the slot die section to the opposite cross-web edge, with the effect of the respective zones additive to one another when there was overlap more than half the distance into the slot (corresponding to approximately the center of the cross-web). The fifteen edge zones where then adjusted using appropriate mathematical solving software to minimize the variability in the cross-web relative to the layer thickness at the center of the cross-web.

Figure 16:
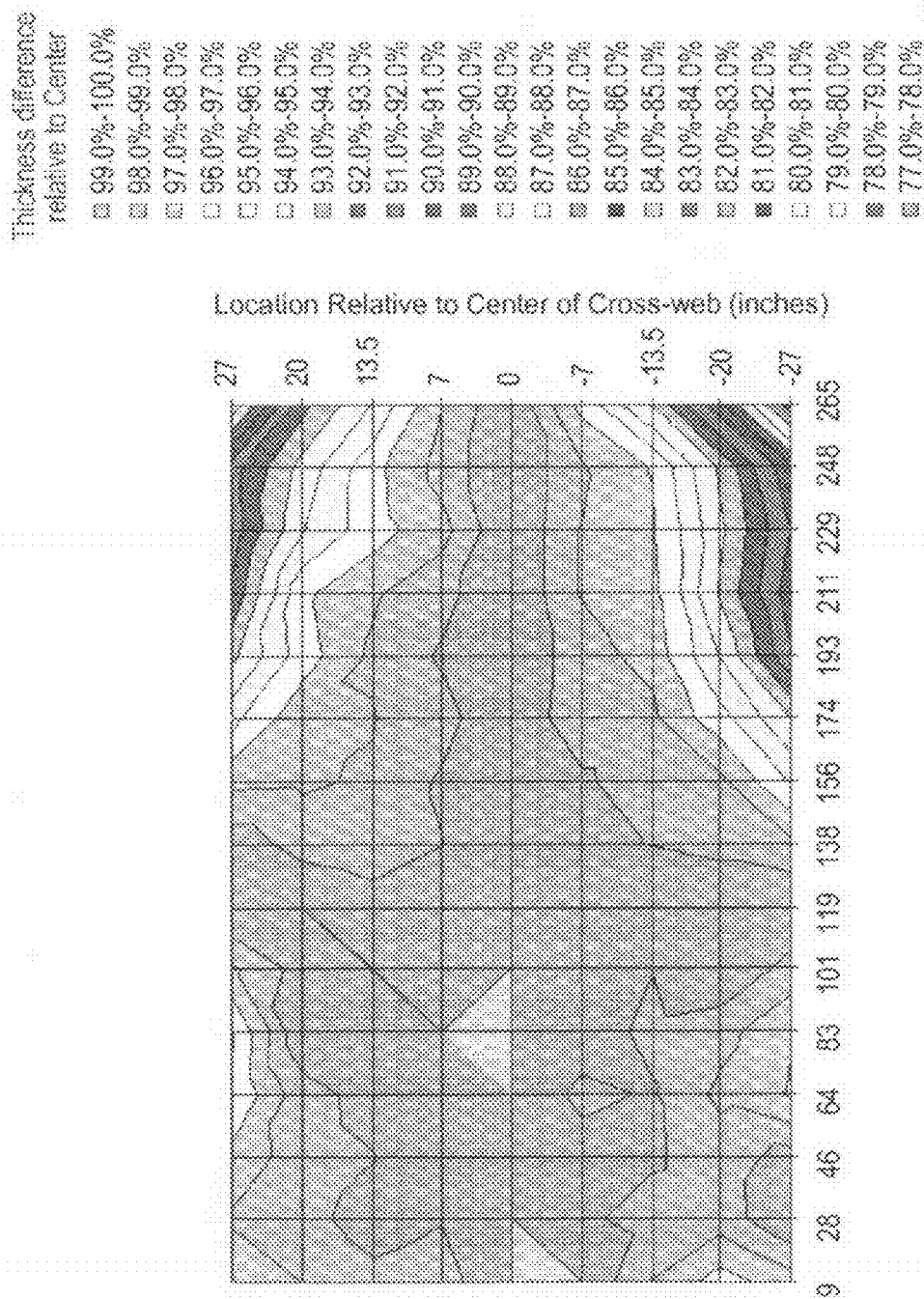
FIGS. 16 and 17 are plots illustrating example variations in a cross-web layer thickness profile of a multilayer film generated in an example film line with and without, respectively, provision of heat flow to a slot die section.
Figure 17:
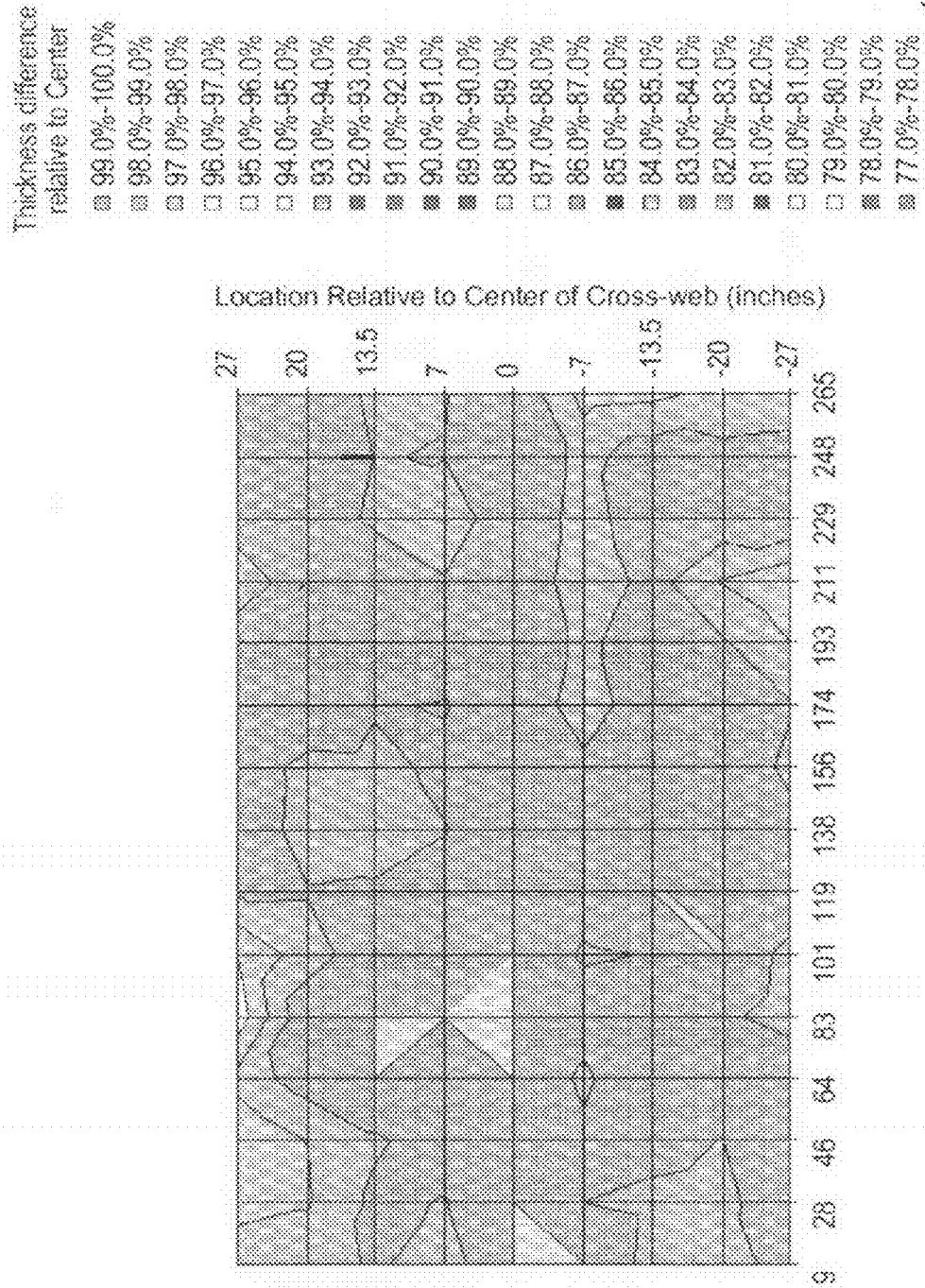

The results are illustrated in FIGS. 16 and 17, which are plots illustrating example variations in a cross-web layer thickness profile of a multilayer film generated in an example film line with and without, respectively, provision of heat flow to a slot die section.

As indicated by FIGS. 16 and 17, a greater level of uniformity in the cross-web layer thickness profile of a multilayer may be possible by controlling heat flow to one or more slots in a slot die section, as described herein. More generally, the described example illustrates that the cross-web layer thickness profile may be controlled to a certain extent by controlling heat flow to one or more slots in a slot die section. In this manner, the cross-web layer thickness profile may be tailored to a target cross-web layer thickness profile to increase the percentage of a multilayer film that may be suitable for an application that requires a highly tailored cross-web layer thickness profile.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

The invention claimed is:

1. A method comprising:
   forming a plurality of polymer layers via a plurality of slots, wherein each slot of the plurality of slots includes a first end, a second end, and an elongated opening extending from the first end and the second end in a cross-web direction;
   controlling heat flow to an edge of at least one of the first end or the second end of each slot of the plurality of the slots in conjunction with the formation of the plurality of polymer layers; and
   combining the plurality of polymer layers to generate a multilayer polymer flow stream, wherein the heat flow to the edge of the at least one of the first end or the second end controls a cross-web layer thickness profile of a multilayer polymer film generated from the multilayer polymer flow stream;
   wherein controlling the heat flow to the edge of the at least one of the first end or the second end of each slot of the plurality of the slots comprises controlling the heat flow to the first end of each slot, wherein the heat flow is controlled via at least one heater located adjacent the first end of each slot, and wherein the first end is between the at least one heater and the elongated opening of each slot.

2. The method of claim 1, wherein controlling heat flow to the edge of the at least one of the first end or the second end of each slot of the plurality of slots comprises selectively providing heat flow to the edge of the at least one of the first end or the second end of at least one slot of the plurality of slots.

3. The method of claim 1, further comprising determining the cross-web layer thickness profile of the multilayer polymer film generated from the multilayer polymer flow stream, wherein controlling the heat flow to the edge of the at least one of the first end or the second end of each slot of the plurality of the slots comprises controlling the heat flow to the edge of the at least one of the first end or the second end of each slot of the plurality of the slots based on the determined cross-web layer thickness profile of the multilayer polymer film.

4. The method of claim 3, further comprising comparing the cross-web layer thickness profile to a target cross-web layer thickness profile to determine one or more profile deviations, wherein controlling the heat flow to the edge of the at least one of the first end or the second end of each slot of the plurality of the slots based on the determined cross-web layer thickness profile of the multilayer polymer film comprises controlling the heat flow to the edge of the at least one of the first end or the second end of each slot of the plurality of the slots based on the one or more determined profile deviations.

5. The method of claim 1, wherein the heat flow to the edge of the at least one of the first end or the second end of each slot of the plurality of slots is configured to create a temperature gradient in the cross-web direction within at least one slot of the plurality of slots.

6. The method of claim 5, wherein the temperature gradient is sufficient to promote polymer flow within a first portion of the at least one slot.

7. The method of claim 1, wherein the multilayer polymer flow stream includes a plurality of first layers comprising a first polymer and a plurality of second layers comprising a second polymer different than the first polymer.

8. The method of claim 1, further comprising generating the multilayer polymer film from the multilayer polymer flow stream.

9. A multilayer film system comprising:
   a feedblock including a plurality of slots configured to form a plurality of polymer layers that are subsequently combined to generate a multilayer polymer flow stream, wherein each slot of the plurality of slots includes a first end, a second end, and an elongated opening extending from the first end and the second end in a cross-web direction; and at least one heater proximate the plurality of slots configured to control heat flow to an edge of at least one of the first end or the second end of each slot of the plurality of slots in conjunction with the formation of the plurality of polymer layers, wherein the heat flow to the edge of the at least one of the first end or the second end controls a cross-web layer thickness profile of a multilayer polymer film generated from the multilayer polymer flow stream;

wherein the at least one heater is configured to control the heat flow to the first end of each slot, wherein the at least one heater is located adjacent the first end of each slot, and wherein the first end is between the at least one heater and the elongated opening of each slot.

10. The system of claim 9, wherein the at least one heater is configured to control the heat flow to the edge of the at least one of the first end or the second end of each slot of the plurality of slots at least in part by selectively providing heat flow to at least one slot of the plurality of slots.

11. The system of claim 9, wherein the at least one heater is configured to control the heat flow to the edge of the at least one of the first end or the second end of each slot of the plurality of slots at least in part by at least one of initiating heat flow from the at least one heater, adjusting heat flow from the at least one heater, or terminating heat flow from the at least one heater to the edge of the at least one of the first end or the second end of at least one slot of the plurality of slots.

12. The system of claim 9, further comprising a monitoring device configured to determine the cross-web layer thickness profile of a multilayer polymer film generated from the multilayer polymer flow stream, wherein the at least one heater is configured to control the heat flow to the edge of the at least one of the first end or the second end of each slot of the plurality of slots based at least in part on the determined cross-web layer thickness profile of the multilayer polymer film.

13. The system of claim 12, wherein the at least one heater is configured to control the heat flow to the edge of the at least one of the first end or the second end of each slot of the plurality of slots based at least in part on one or more profile deviations determined by a comparison of the determined cross-web layer thickness profile to a target cross-web layer thickness profile.

14. The system of claim 9, wherein the heat flow to the edge of the at least one of the first end or the second end of each slot of the plurality of slots creates a temperature gradient in the cross-web direction within at least one slot of the plurality of slots.

15. The system of claim 14, wherein the temperature gradient is sufficient to promote polymer flow within a first portion of the at least one slot.

16. The system of claim 9, wherein the at least one heater comprises a first heater configured to provide heat flow to the edge of the first end of at least one slot of the plurality of slots.

17. The system of claim 16, further comprising a second heater configured to provide heat flow to the edge of the second end of the at least one slot of the plurality of slots.

18. The system of claim 9, wherein the multilayer polymer flow stream includes a plurality of first layers comprising a first polymer and a plurality of second layers comprising a second polymer different than the first polymer.

19. The system of claim 9, further comprising generating a multilayer polymer film from the multilayer polymer flow stream.

20. The system of claim 9, wherein the at least one heater extends substantially along the entire length of the plurality of slots in a direction normal to a layer plane.

21. The system of claim 9, wherein the plurality of slots includes at least 50 slots.

* * * * *